(12) United States Patent
Busbey et al.

(10) Patent No.: US 9,297,357 B2
(45) Date of Patent: Mar. 29, 2016

(54) BLADE INSERT FOR A WIND TURBINE ROTOR BLADE

(71) Applicant: General Electric Company, Schenectady, NY (US)

(72) Inventors: Bruce Clark Busbey, Greenville, SC (US); Darren John Danielsen, Glenville, NY (US)

(73) Assignee: General Electric Company, Schenectady, NY (US)

( * ) Notice: Subject to any disclaimer, the term of this patent is extended or adjusted under 35 U.S.C. 154(b) by 425 days.

(21) Appl. No.: 13/856,635

(22) Filed: Apr. 4, 2013

(65) Prior Publication Data

US 2014/0301855 A1 Oct. 9, 2014

(51) Int. Cl.
*F01D 5/14* (2006.01)
*F03D 1/06* (2006.01)
*F03D 1/00* (2006.01)

(52) U.S. Cl.
CPC .............. *F03D 1/0641* (2013.01); *F03D 1/001* (2013.01); *F03D 1/065* (2013.01); *F03D 1/0675* (2013.01); *F03D 1/0683* (2013.01); *F05B 2240/302* (2013.01); *Y02E 10/721* (2013.01); *Y10T 29/49337* (2015.01)

(58) Field of Classification Search
USPC ....................... 416/223 R, 224, 225, 226, 228
See application file for complete search history.

(56) References Cited

U.S. PATENT DOCUMENTS

| 2,312,219 | A | 4/1943 | Sensenich |
| 4,474,536 | A | 10/1984 | Gougeon et al. |
| 4,732,542 | A | 3/1988 | Hahn et al. |
| 5,088,665 | A | 2/1992 | Vijgen et al. |
| 6,729,846 | B1 | 5/2004 | Wobben |
| 6,972,498 | B2 | 12/2005 | Jamieson et al. |
| 7,334,989 | B2 | 2/2008 | Arelt |
| 7,381,029 | B2 | 6/2008 | Moroz |
| 7,393,184 | B2 | 7/2008 | Cairo |

(Continued)

FOREIGN PATENT DOCUMENTS

| DE | 19962989 | 7/2001 |
| DE | 10336461 | 3/2005 |

(Continued)

OTHER PUBLICATIONS

International Search Report and Written Opinion issued in connection with corresponding PCT Application No. PCT/US2014/031164 on Jun. 26, 2014.

(Continued)

*Primary Examiner* — Binh Q Tran
(74) *Attorney, Agent, or Firm* — Dority & Manning, P.A.

(57) ABSTRACT

A blade insert for coupling a first blade segment to a second blade segment is disclosed. The blade insert may generally include an aerodynamic body extending between a forward end configured to be coupled to the first blade segment and an aft end configured to be coupled to the second blade segment. The aerodynamic body may include a top side extending between a forward edge and an aft edge. The top side may define a top scarfed section at its forward edge. The aerodynamic body may further include a bottom side extending between a forward edge and an aft edge. The bottom side may define a bottom scarfed section at its forward edge. Additionally, at least a portion of the forward edge of the top side may be configured to be offset relative to the forward edge of the bottom side.

20 Claims, 15 Drawing Sheets

(56) References Cited

U.S. PATENT DOCUMENTS

| | | |
|---|---|---|
| 7,427,189 B2 | 9/2008 | Eyb |
| 7,470,114 B2 | 12/2008 | Bonnet |
| 7,517,198 B2 | 4/2009 | Baker et al. |
| 7,521,105 B2 | 4/2009 | Bech et al. |
| 7,581,926 B1 | 9/2009 | Dehlsen et al. |
| 7,582,977 B1 | 9/2009 | Dehlsen et al. |
| 7,637,721 B2 | 12/2009 | Driver et al. |
| 7,740,453 B2 | 6/2010 | Zirin et al. |
| 7,798,780 B2 | 9/2010 | Bakhuis et al. |
| 7,922,454 B1 * | 4/2011 | Riddell .................. 416/224 |
| 7,927,077 B2 | 4/2011 | Olson |
| 7,976,275 B2 | 7/2011 | Miebach et al. |
| 8,172,539 B2 * | 5/2012 | Kootstra ................. 416/223 R |
| 8,449,259 B1 * | 5/2013 | Kaser ..................... 416/146 R |
| 8,510,947 B2 * | 8/2013 | Kirkpatrick et al. ....... 29/889.71 |
| 8,517,689 B2 * | 8/2013 | Kyriakides et al. ........... 416/226 |
| 8,764,401 B2 * | 7/2014 | Hayden et al. ............ 416/213 R |
| 8,939,726 B2 * | 1/2015 | Grabau ......................... 416/39 |
| 2003/0044274 A1 | 3/2003 | Deane et al. |
| 2003/0223868 A1 | 12/2003 | Dawson et al. |
| 2005/0180853 A1 | 8/2005 | Grabau et al. |
| 2006/0045743 A1 | 3/2006 | Bertolotti et al. |
| 2006/0104812 A1 | 5/2006 | Kovalsky et al. |
| 2006/0175731 A1 | 8/2006 | Bech et al. |
| 2007/0025856 A1 | 2/2007 | Moroz |
| 2007/0065290 A1 | 3/2007 | Herr |
| 2007/0077150 A1 | 4/2007 | Llorente Gonzalez |
| 2007/0243387 A1 | 10/2007 | Lin et al. |
| 2007/0253824 A1 | 11/2007 | Eyb |
| 2007/0286728 A1 | 12/2007 | Hotto |
| 2007/0290118 A1 | 12/2007 | Stiesdal |
| 2008/0061192 A1 | 3/2008 | Sullivan |
| 2008/0069699 A1 | 3/2008 | Bech |
| 2008/0107540 A1 | 5/2008 | Bonnet |
| 2008/0145231 A1 | 6/2008 | Llorente Gonzales et al. |
| 2008/0166241 A1 | 7/2008 | Herr et al. |
| 2008/0181781 A1 | 7/2008 | Livingston |
| 2008/0206062 A1 | 8/2008 | Sanz Pascual et al. |
| 2008/0232966 A1 | 9/2008 | Wang et al. |
| 2008/0240925 A1 | 10/2008 | Kita et al. |
| 2009/0016891 A1 | 1/2009 | Parsania et al. |
| 2009/0074585 A1 | 3/2009 | Koegler et al. |
| 2009/0116962 A1 | 5/2009 | Pedersen et al. |
| 2009/0136355 A1 | 5/2009 | Finnigan et al. |
| 2009/0155084 A1 | 6/2009 | Livingston et al. |
| 2009/0162206 A1 | 6/2009 | Zirin et al. |
| 2009/0169323 A1 | 7/2009 | Livingston |
| 2009/0169390 A1 | 7/2009 | Nies |
| 2009/0236857 A1 | 9/2009 | Stommel |
| 2009/0283639 A1 | 11/2009 | Ackermann et al. |
| 2009/0304507 A1 | 12/2009 | Dehlsen |
| 2009/0311106 A1 | 12/2009 | Rohden |
| 2009/0324420 A1 | 12/2009 | Arocena de la Rua et al. |
| 2010/0054950 A1 | 3/2010 | Rao Kavala |
| 2010/0132884 A1 | 6/2010 | Baehmann et al. |
| 2010/0143143 A1 | 6/2010 | Judge |
| 2010/0143148 A1 | 6/2010 | Chen et al. |
| 2011/0142667 A1 | 6/2011 | Miebach et al. |
| 2011/0142675 A1 | 6/2011 | van der Bos |

FOREIGN PATENT DOCUMENTS

| | | |
|---|---|---|
| EP | 1244873 | 2/2002 |
| EP | 1507084 | 2/2005 |
| EP | 1761702 | 3/2007 |
| EP | 1953383 | 8/2008 |
| EP | 2028366 | 2/2009 |
| EP | 2053240 | 4/2009 |
| JP | 2002357176 | 12/2002 |
| JP | 2003254225 | 9/2003 |
| WO | WO 01/46582 | 6/2001 |
| WO | WO 03/078832 | 9/2003 |
| WO | WO03/102414 | 12/2003 |
| WO | WO 03102414 | 12/2003 |
| WO | WO 2004015265 | 2/2004 |
| WO | WO 2004076852 | 9/2004 |
| WO | WO 2004078465 | 9/2004 |
| WO | WO 2005031158 | 4/2005 |
| WO | WO 2005/064156 | 7/2005 |
| WO | WO 2005/100781 | 10/2005 |
| WO | WO 2006/002621 | 1/2006 |
| WO | WO 2006/056584 | 6/2006 |
| WO | WO 2006069581 | 7/2006 |
| WO | WO 2006070171 | 7/2006 |
| WO | WO 2006103307 | 10/2006 |
| WO | WO 2006133715 | 12/2006 |
| WO | WO2008035149 | 3/2008 |
| WO | WO2008/113349 | 9/2008 |
| WO | WO2009/025549 | 2/2009 |
| WO | WO 2009135902 | 11/2009 |
| WO | WO 2009156064 | 12/2009 |
| WO | WO2010/086297 A2 | 8/2010 |
| WO | WO2012/004571 A2 | 1/2012 |

OTHER PUBLICATIONS

U.S. Appl. No. 13/663,779, filed Oct. 30, 2012.
U.S. Appl. No. 13/663,785, filed Oct. 30, 2012.
U.S. Appl. No. 12/915,686, filed Oct. 29, 2010.
Related U.S. Appl. No. 12/431,281, filed Apr. 28, 2009.
Related U.S. Appl. No. 12/817,549, filed Jun. 17, 2010.
Related U.S. Appl. No. 12/859,585, filed Aug. 19, 2010.
Related U.S. Appl. No. 12/861,145, filed Aug. 23, 2010.
Related U.S. Appl. No. 13/115,604, filed May 25, 2011.
Related U.S. Appl. No. 13/220,044, filed Aug. 29, 2011.
Related U.S. Appl. No. 13/272,327, filed Oct. 13, 2011.
Mark Hancock (Vestas Technology UK), *Large Multi-Part Offshore Blades Project*, 28 pages, Jun. 8, 2006, DTI & BWEA Offshore Wind R&D Workshop.
F. Sayer et al., *Testing of Adhesive joints in the Wind Industry*, 10 pages, 2009, Germany.
*Spabond 340—Epoxy Adhesive System*, 7 pages, Feb. 8, 2008.
*Spabond 340LV—Epoxy Adhesive System*, 6 pages, Sep. 13, 2009.
*HyperSizer Composite Wind Blade Software*, 16 pages, Apr. 2010.
Angel Gonzalez Palacios, *WP-1B1: Innovative Rotor Blade*, 17 pages, Oct. 9, 2008, Brussels.
Dr. Maite Basutro, *Innovative Rotor Blades—Innoblade*, 2 pages.
www.wind-energy-the-facts.org/enpart-i-technology/chapter-3-wind-turbine-technology/current-developments.
W.E. Handbook Structural Design pp. 1-16.

* cited by examiner

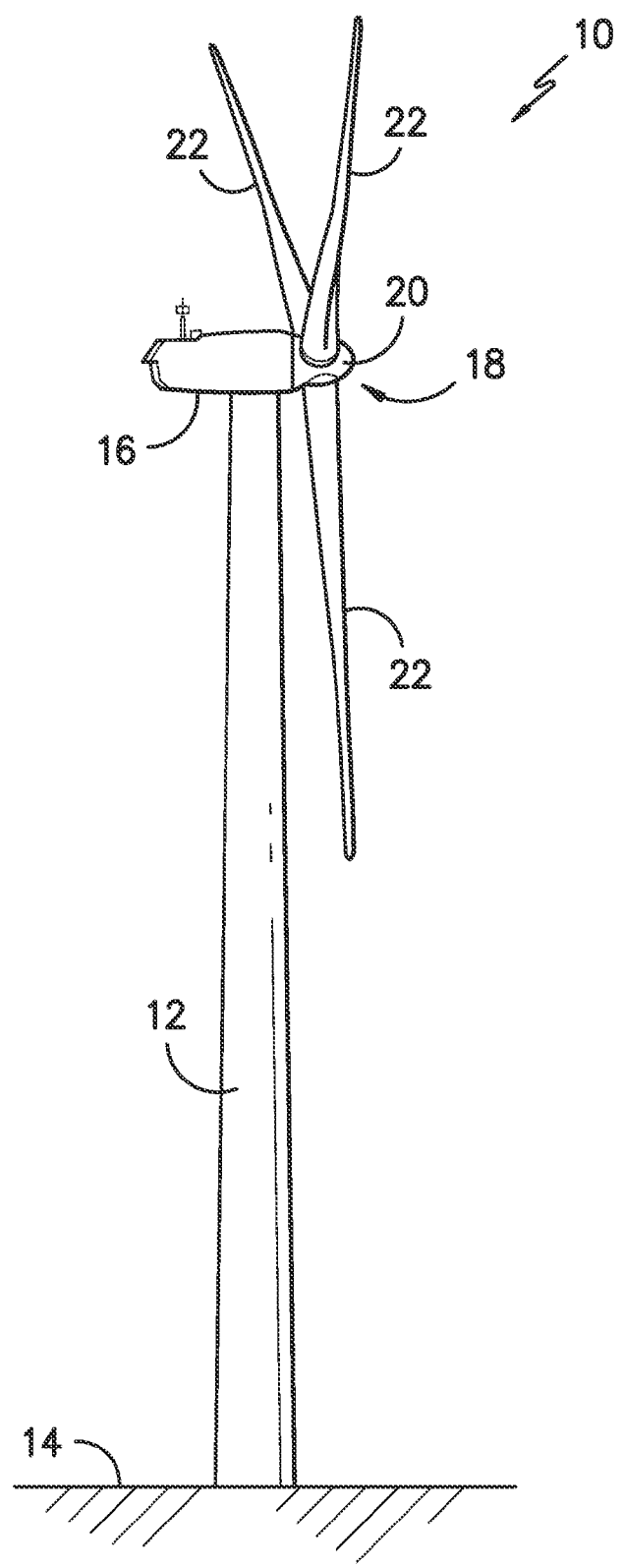
FIG. -1-

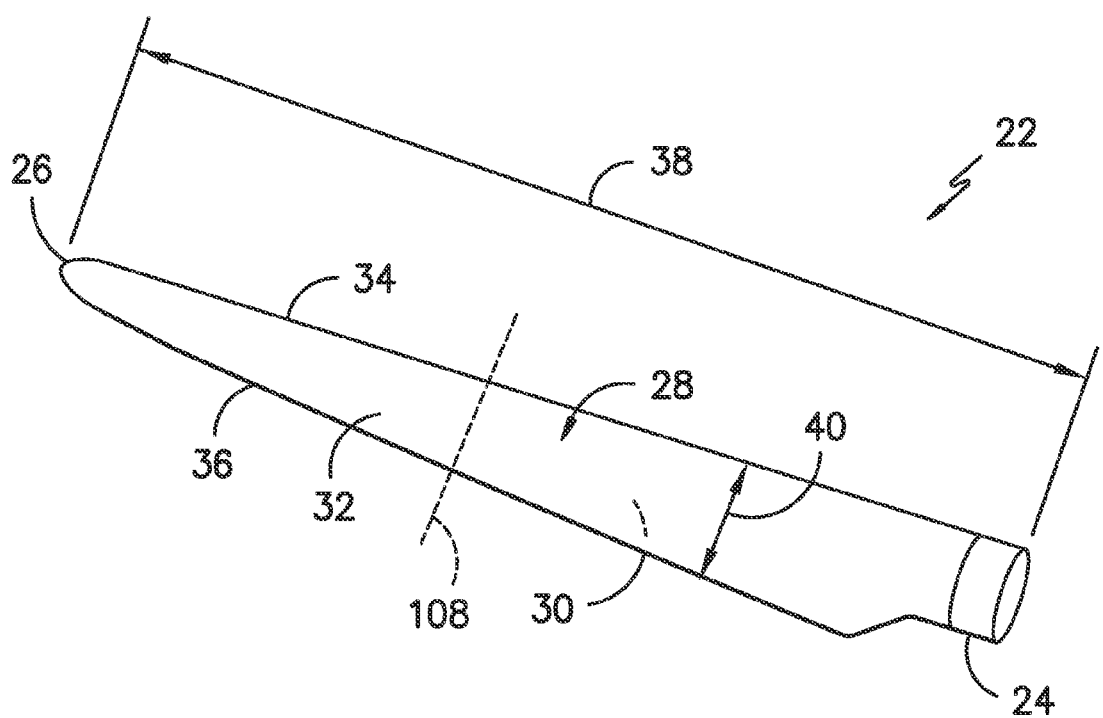
FIG. -2-

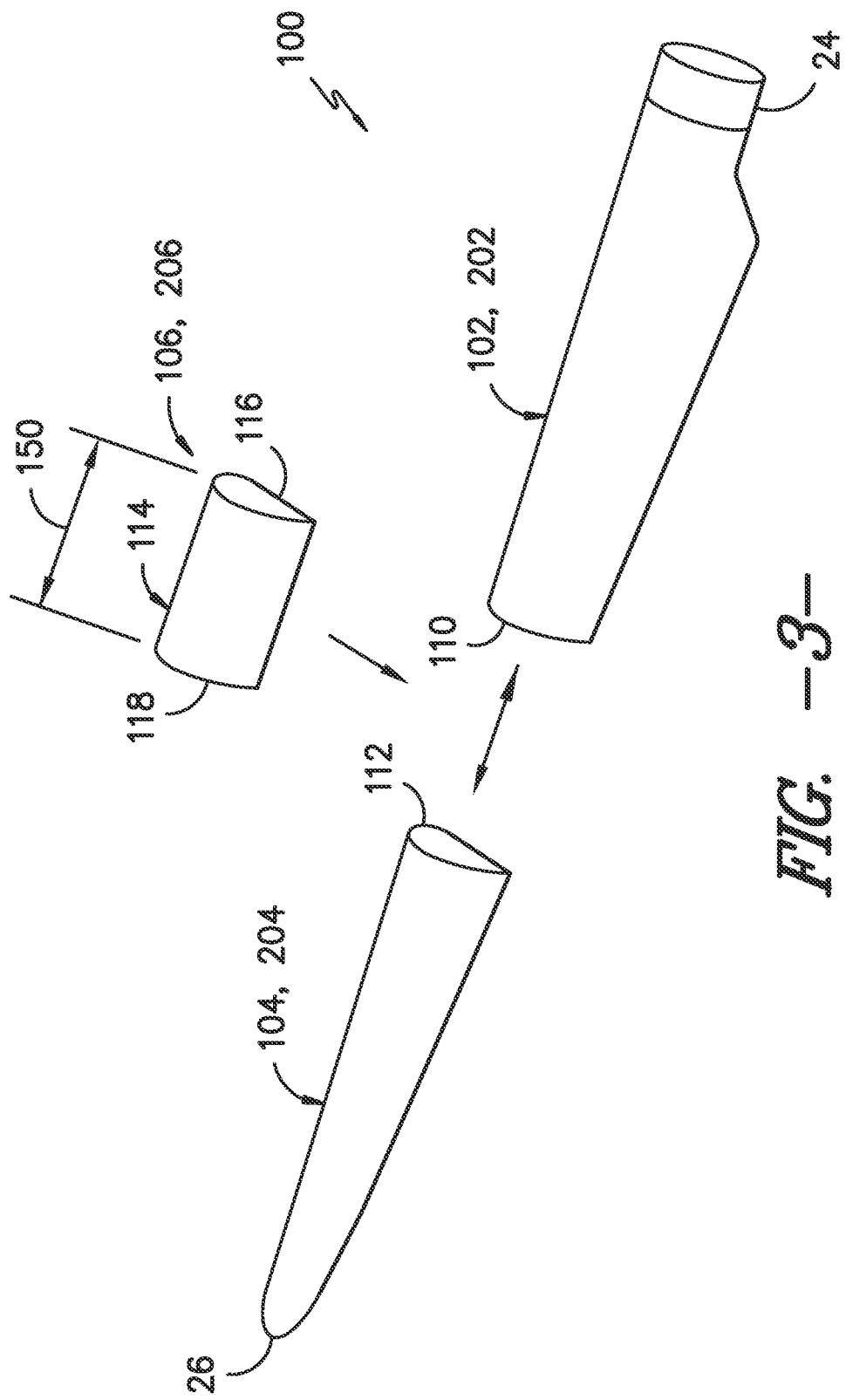
FIG. —3—

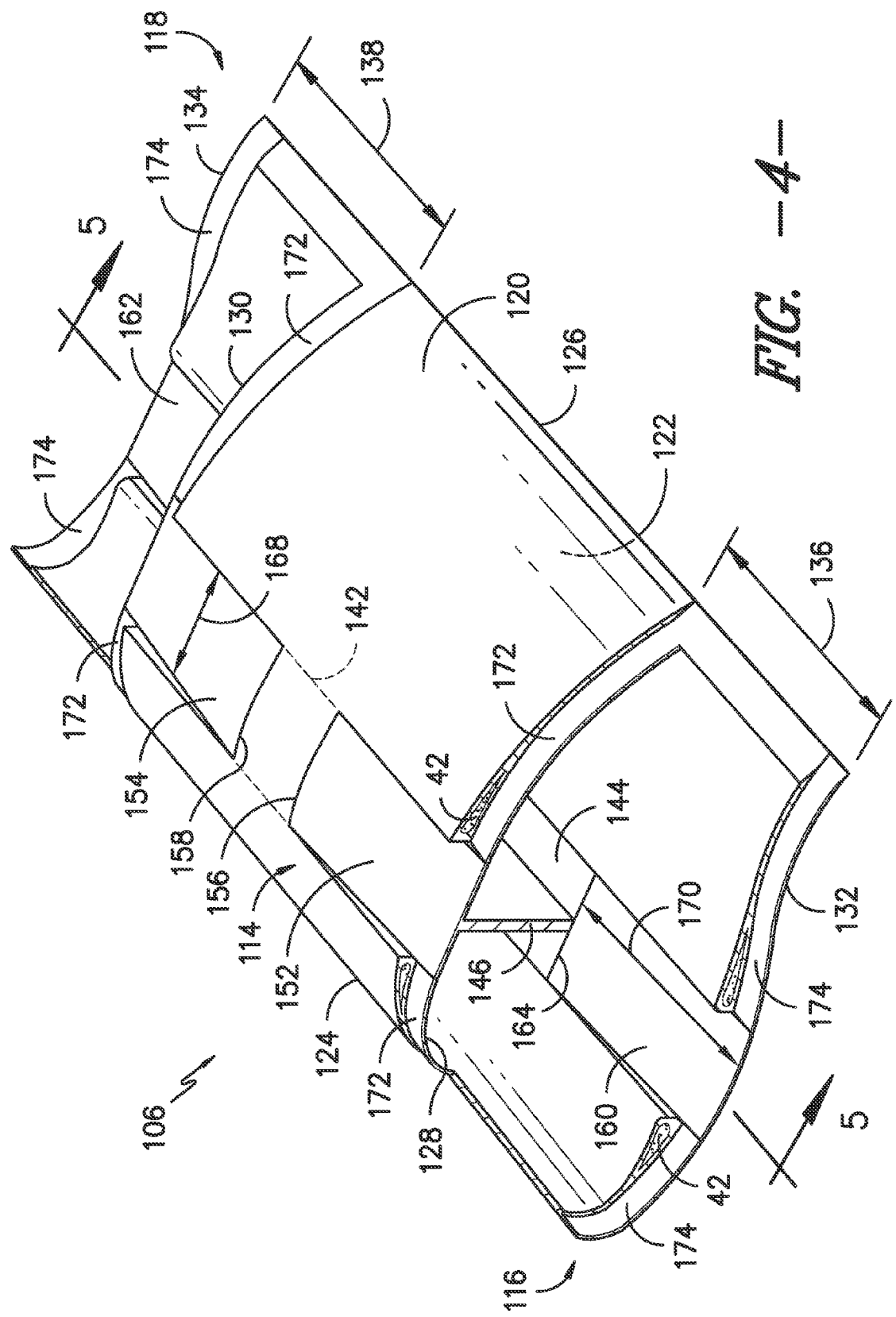
FIG. -4-

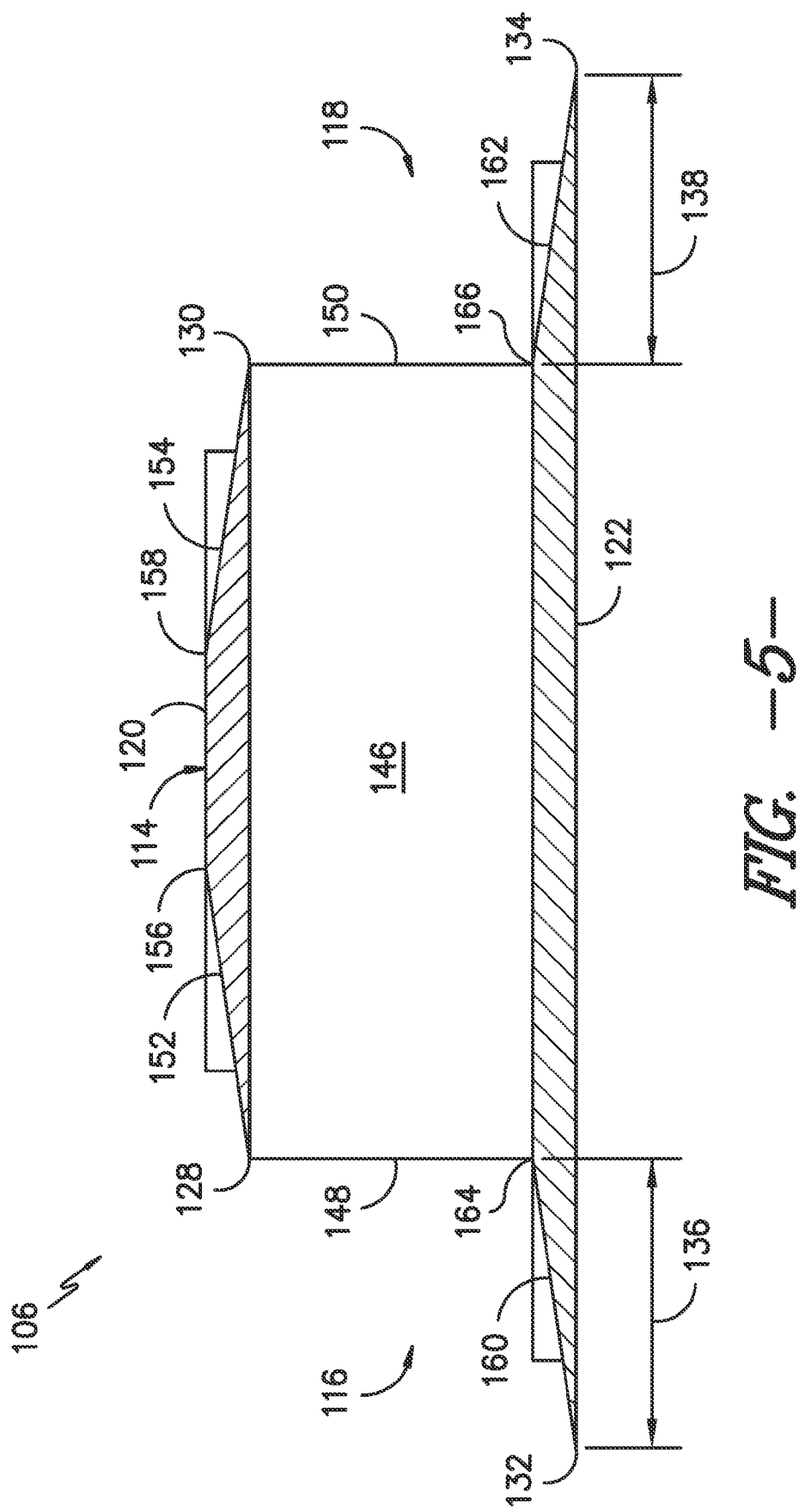
FIG. -5-

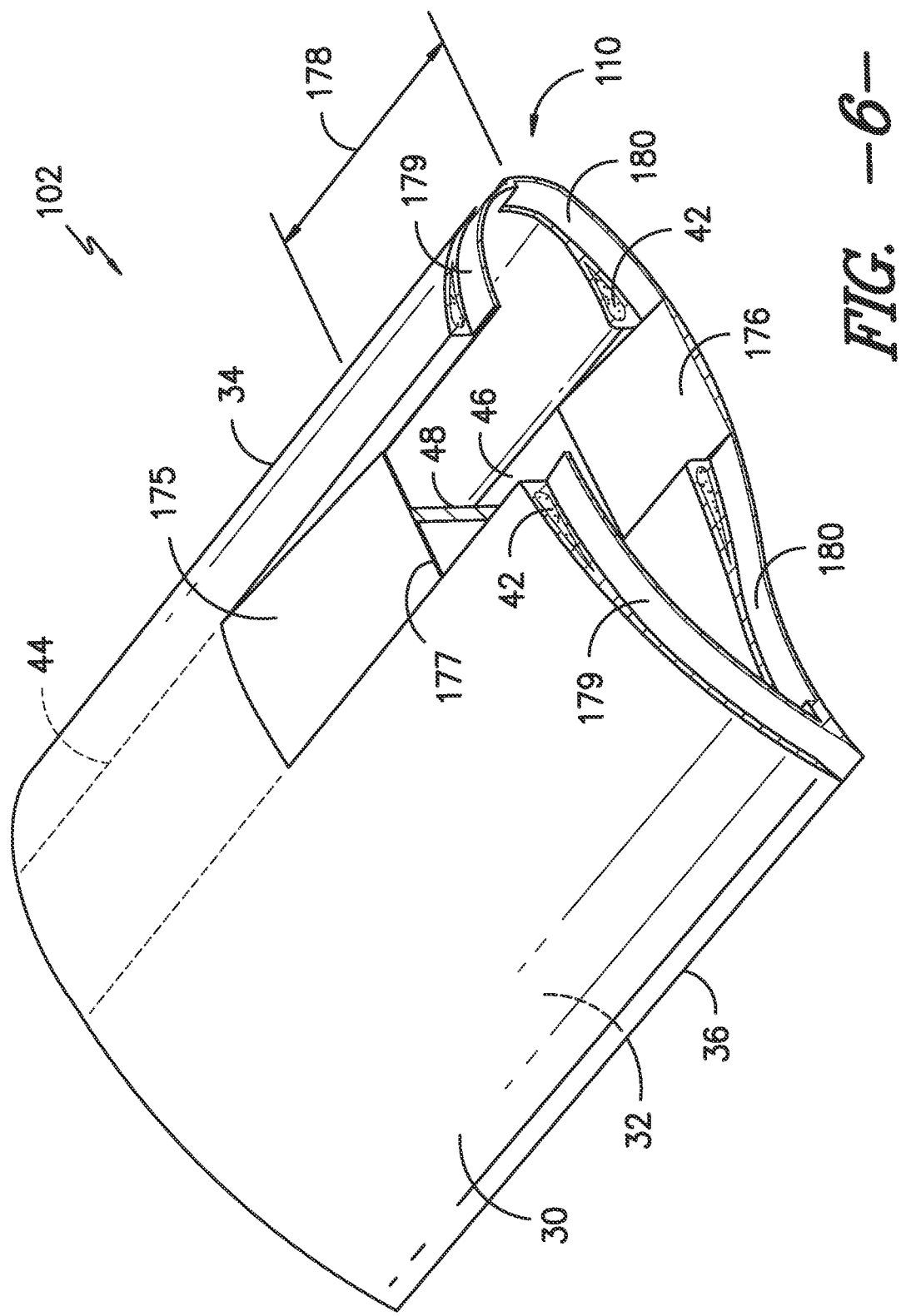

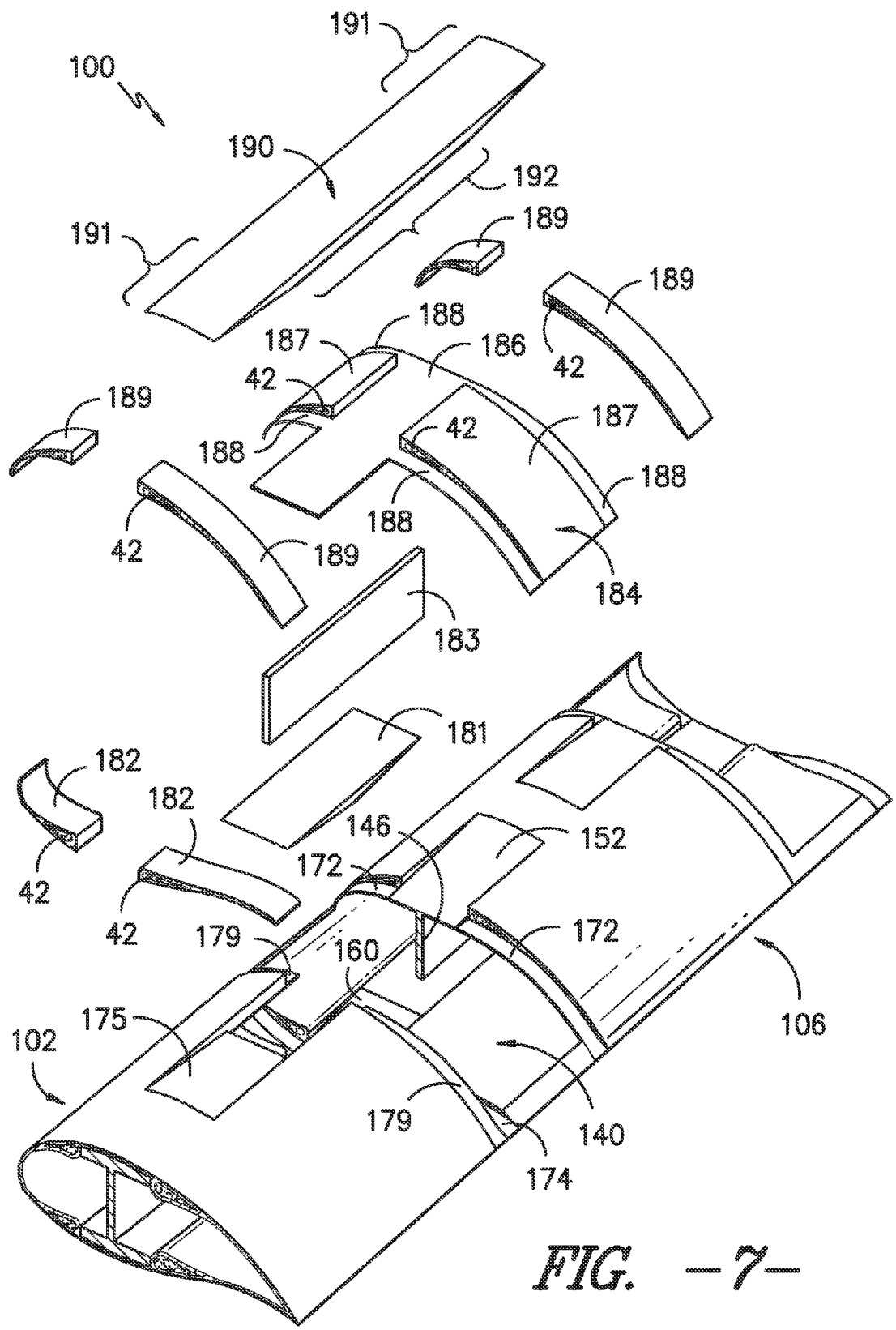
FIG. -7-

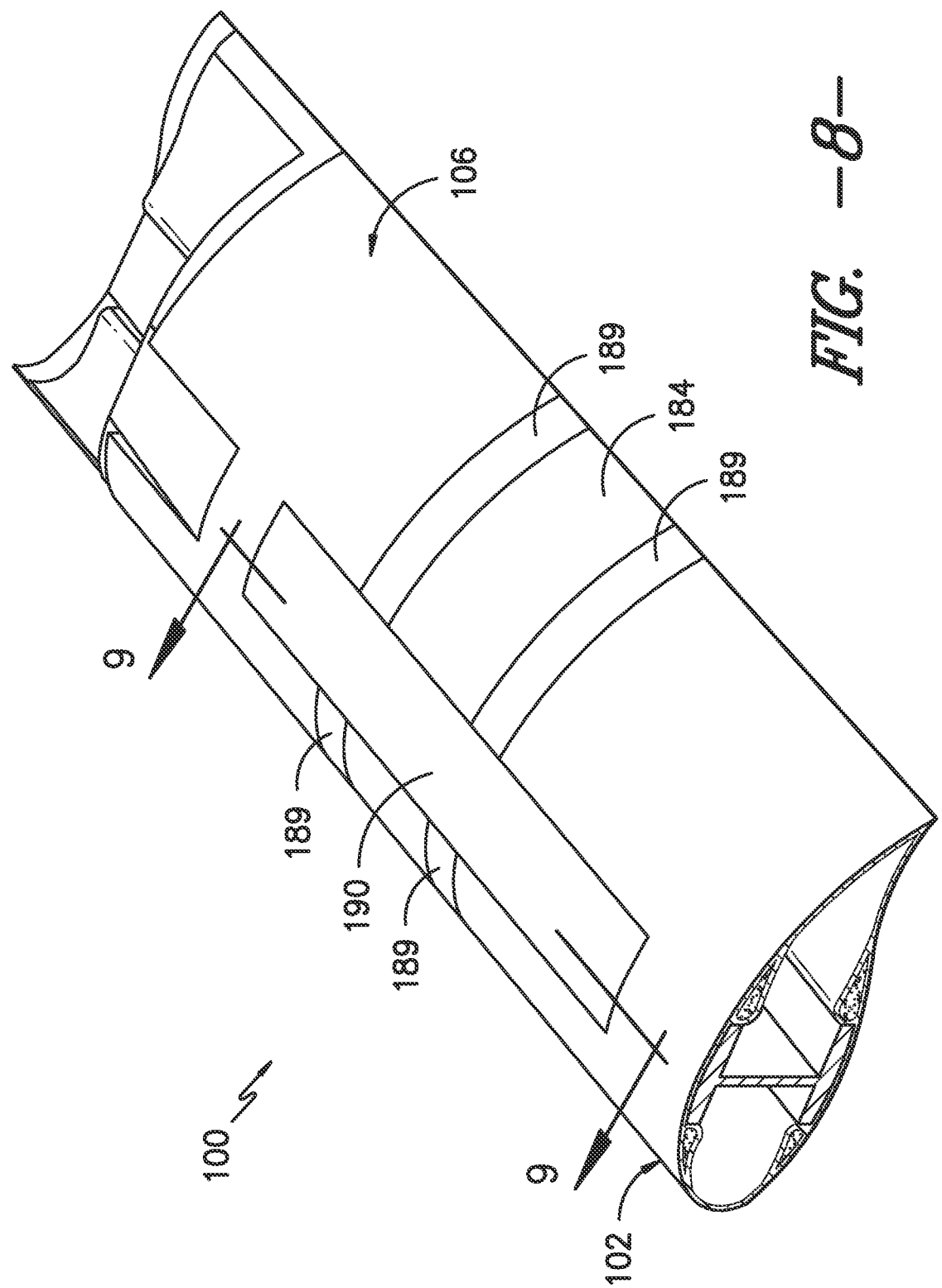

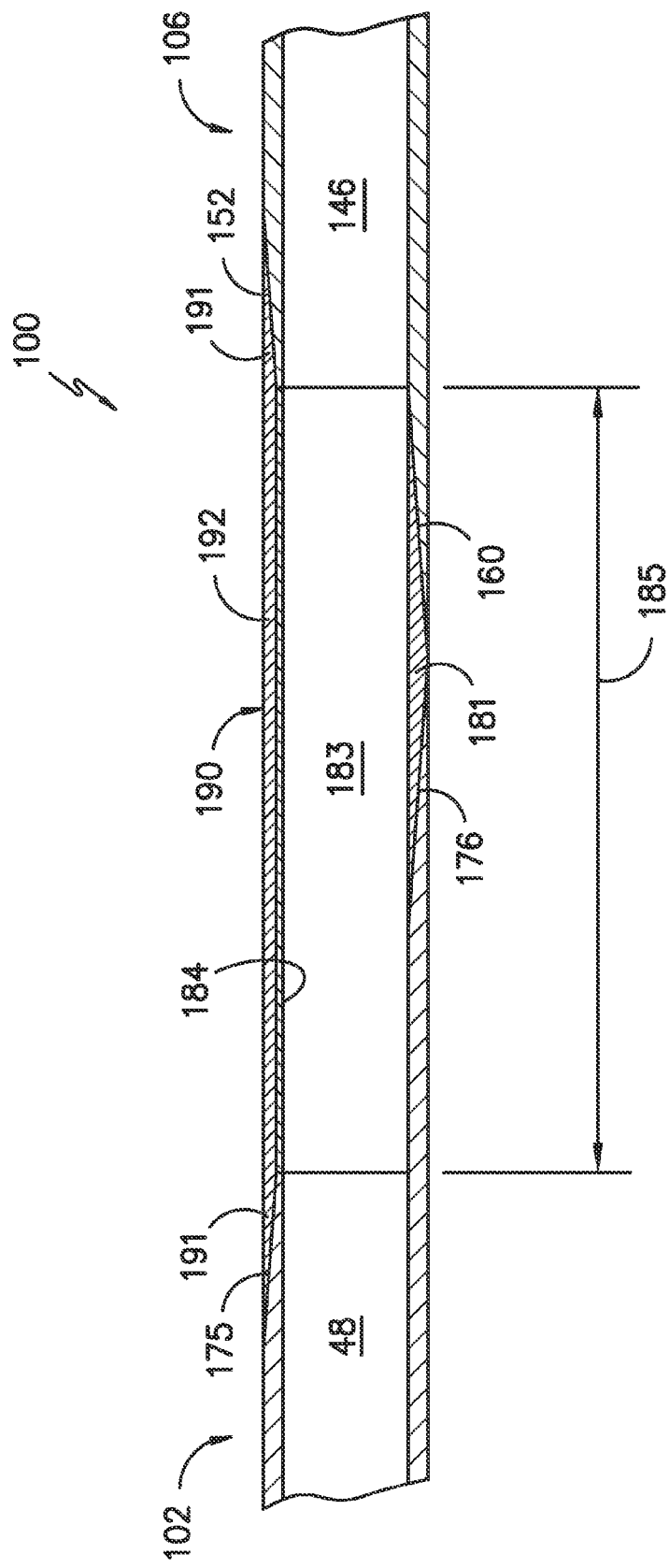
FIG. -9-

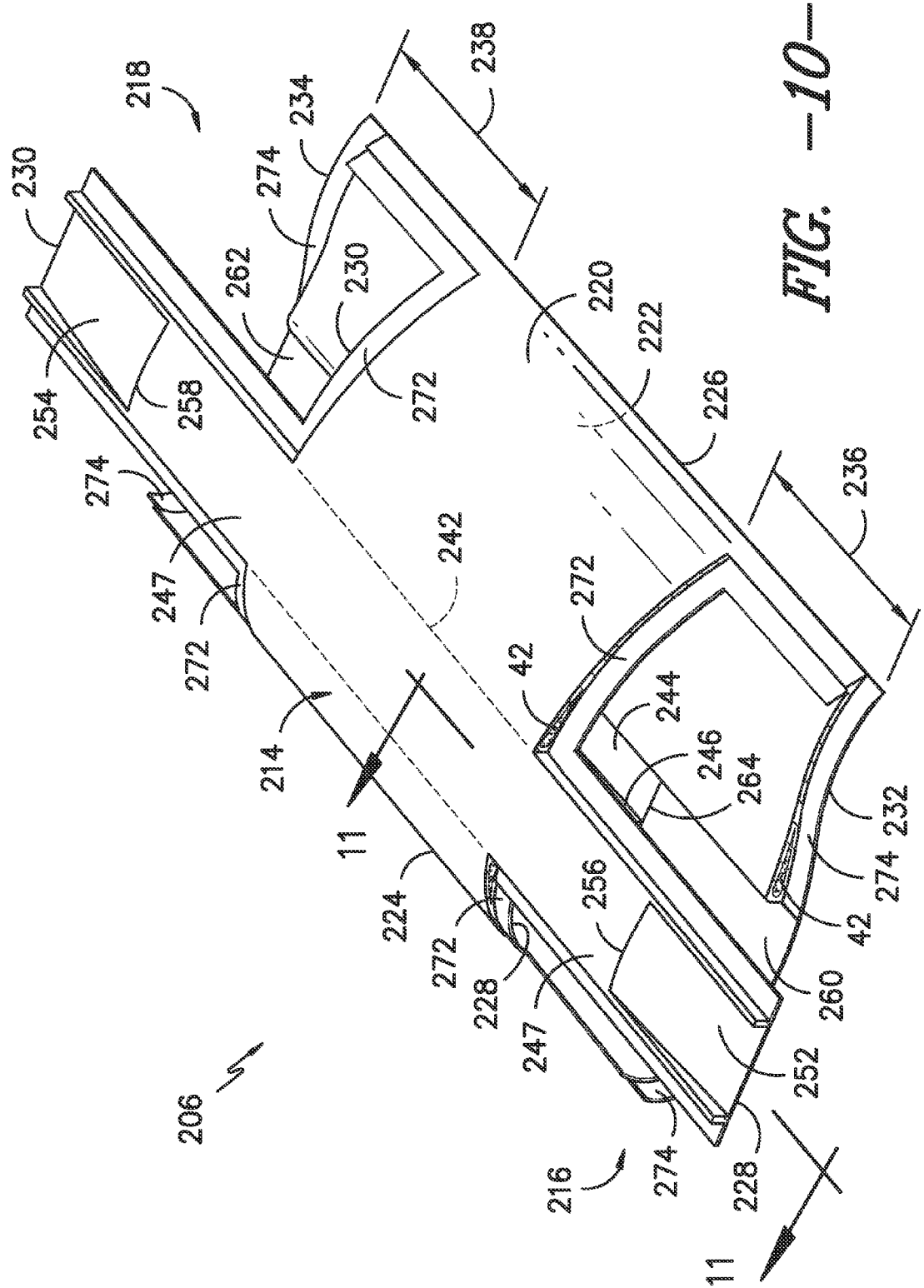

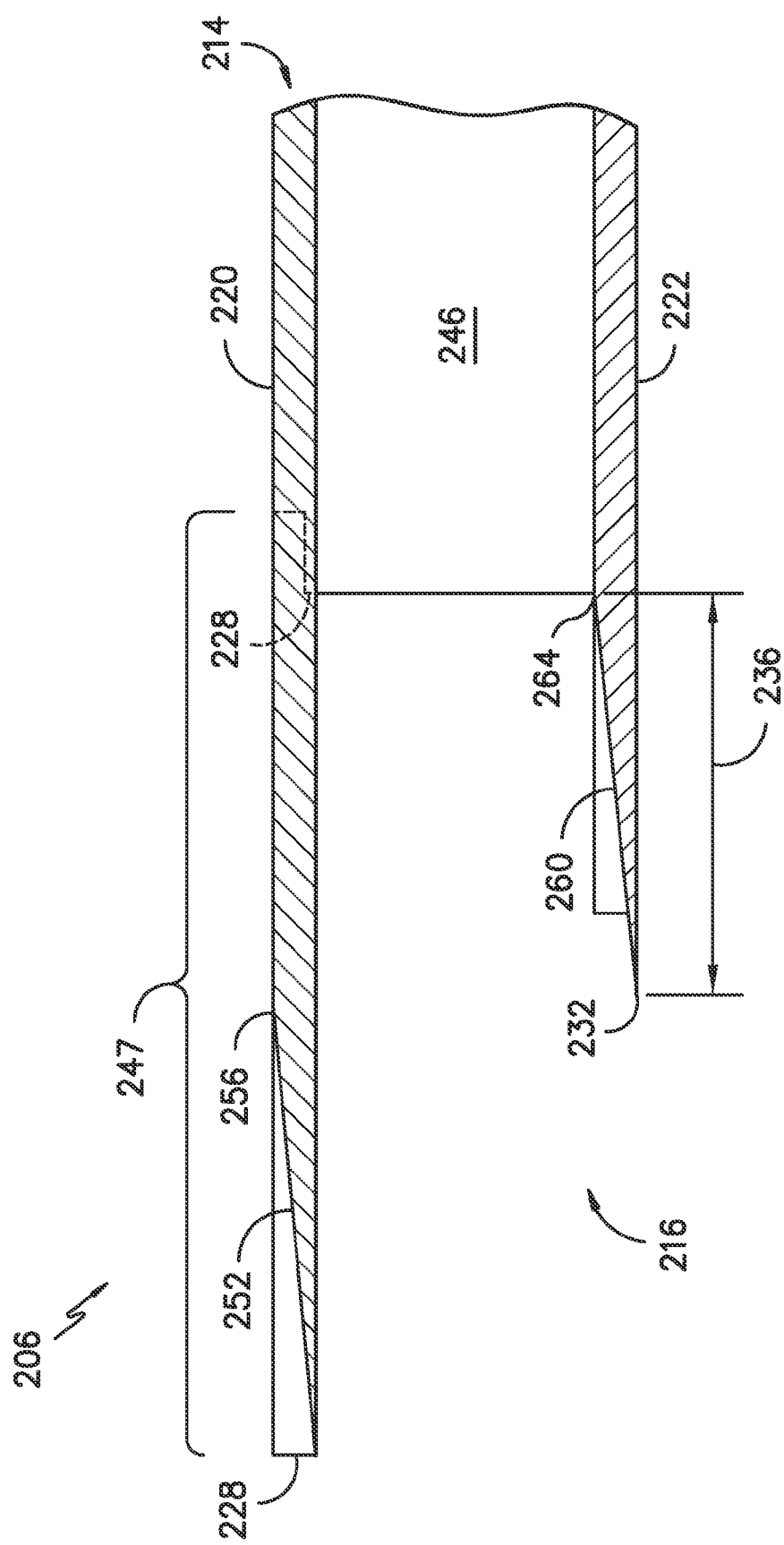
FIG. -11-

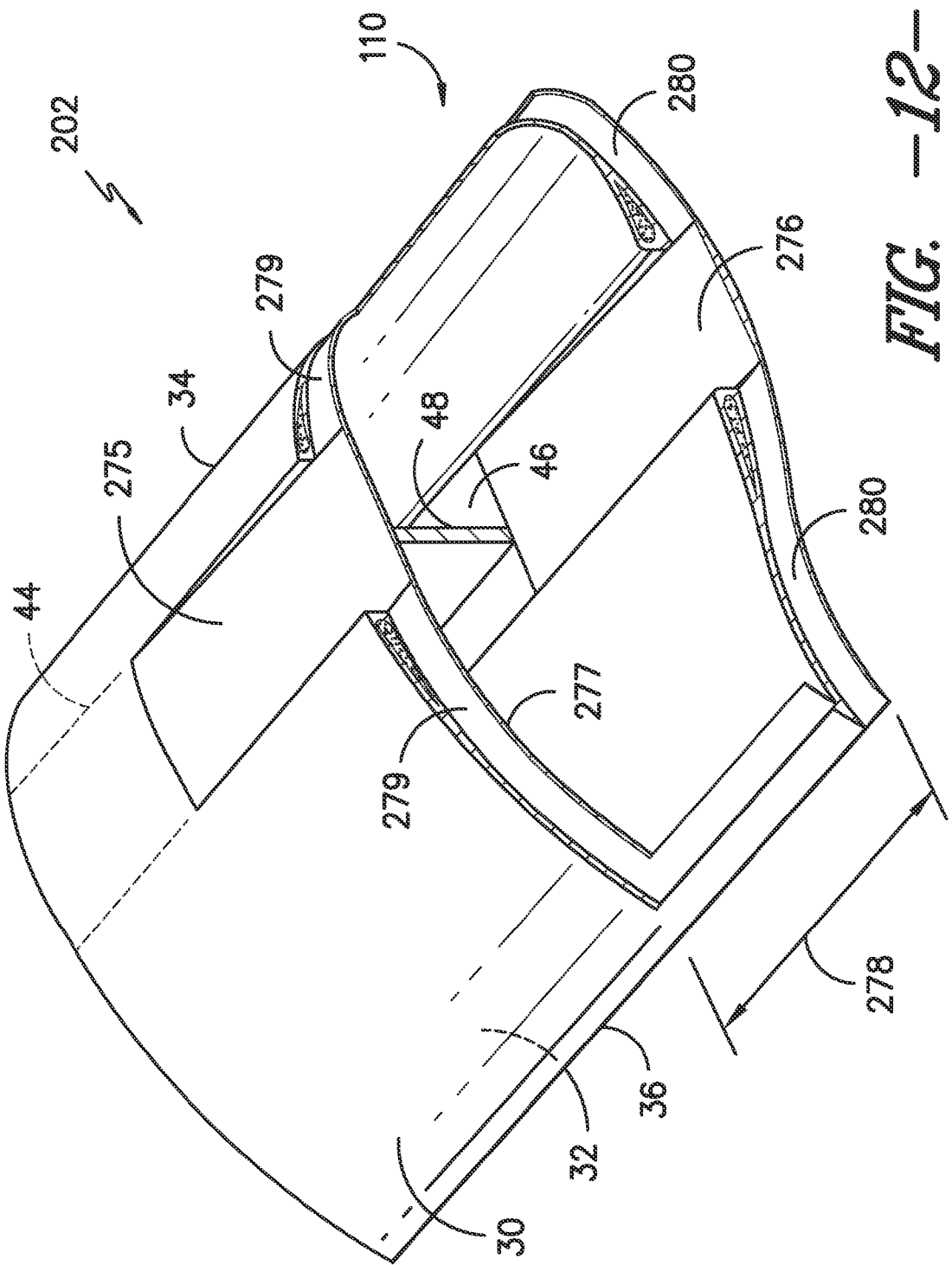

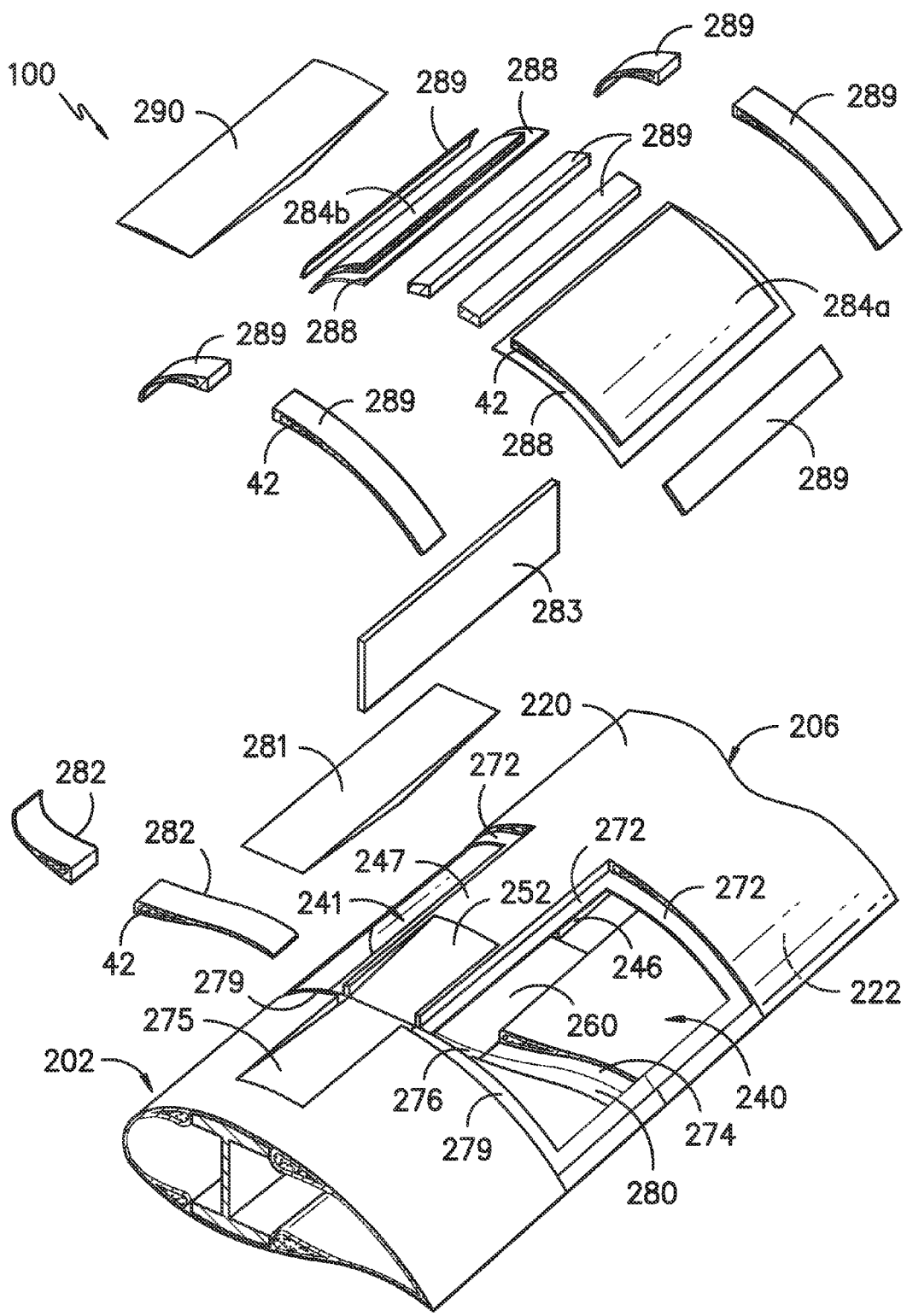
FIG. -13-

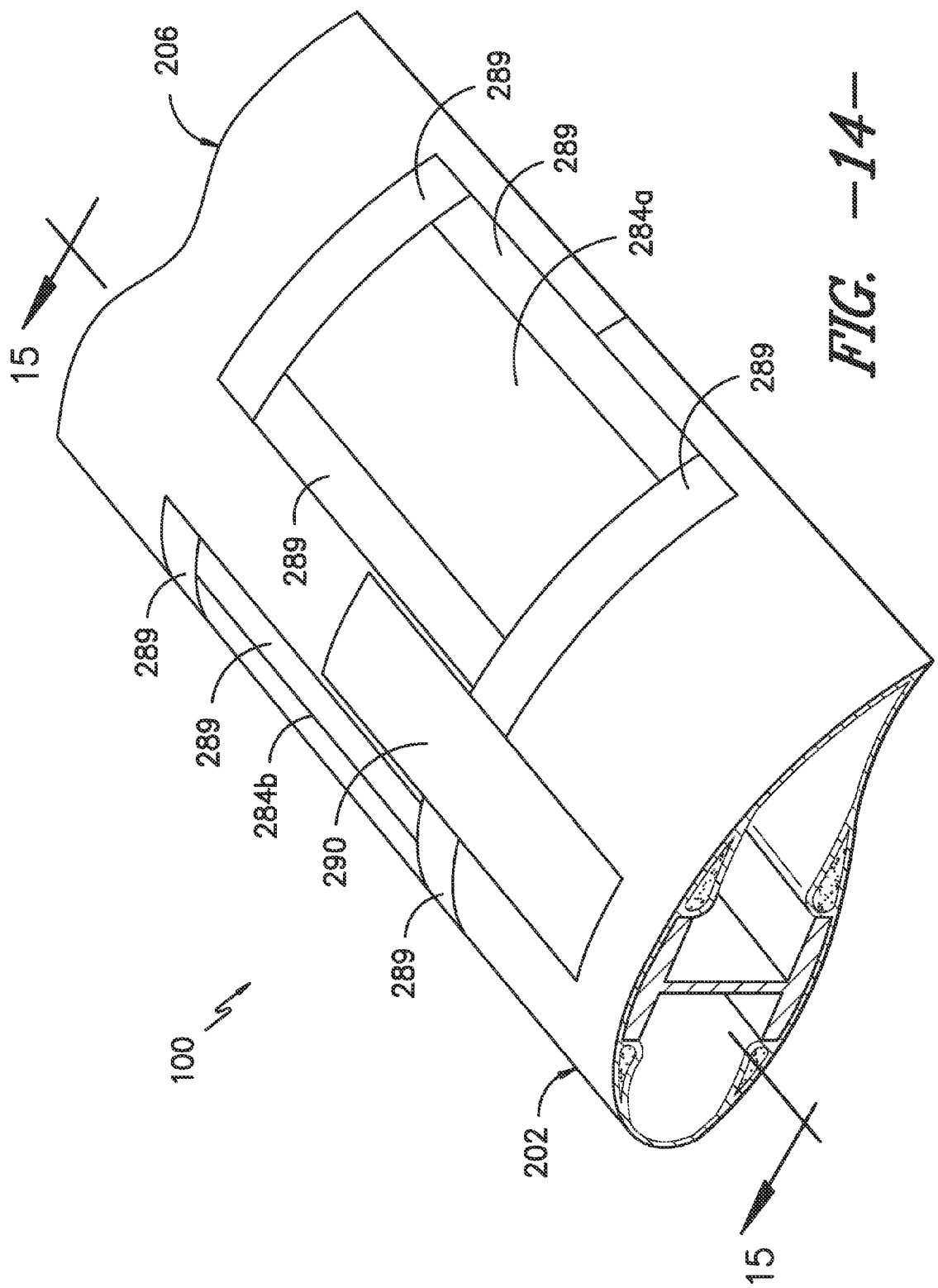
FIG. -14-

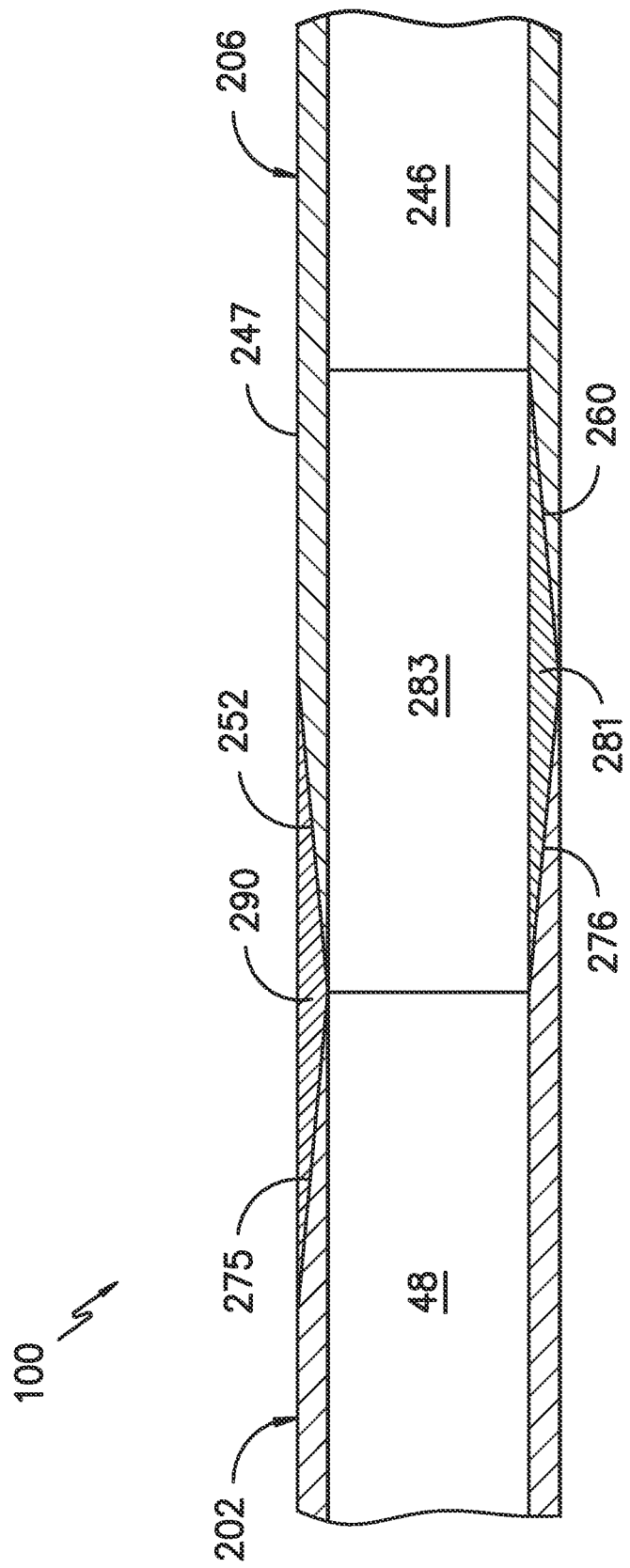
FIG. -15-

BLADE INSERT FOR A WIND TURBINE ROTOR BLADE

FIELD OF THE INVENTION

The present subject matter relates generally to wind turbines and, more particularly, to a blade insert for extending the length of a wind turbine rotor blade.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more turbine blades. The turbine blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the rotor blades. However, as is generally known, the deflection of a rotor blade is a function of blade length, along with wind speed, turbine operating states and blade stiffness. Thus, longer rotor blades may be subject to increased deflection forces, particularly when a wind turbine is operating in high-speed wind conditions. These increased deflection forces not only produce fatigue on the rotor blades and other wind turbine components but may also increase the risk of the rotor blades striking the tower.

In order to increase the length of wind turbine rotor blades without adversely affecting the aerodynamic design, it is known to install tip extensions onto the blades. Typically, a conventional tip extension is installed onto a rotor blade by cutting-off a portion of the blade at its tip and replacing such cut-off portion with the tip extension. However, due to the fact that a portion of the rotor blade must be cut-off and because the elongated rotor blade will be subjected to increased loads, the tip extension must be significantly longer than the actual increase in rotor blade length that can be achieved by installing the extension. For example, a conventional tip extension may often need to have a length of almost half of the original span of the rotor blade to accommodate the increased loading on the blade. As such, due to their length, the costs of manufacturing and transporting conventional tip extensions can be prohibitively expensive.

Accordingly, a blade insert that can be used to increase the span of a rotor blade by an amount generally corresponding to the overall length of the blade insert would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor blade assembly for a wind turbine. The rotor blade assembly may generally include a first blade segment defining a first joint end, a second blade segment defining a second joint end and a blade insert extending between a forward end coupled to the first blade segment and an aft end coupled to the second blade segment. The blade insert may include a top side extending between a forward edge and an aft edge. The top side may define a top scarfed section at its forward edge. The blade insert may also include a bottom side extending between a forward edge and an aft edge. The bottom side may define a bottom scarfed section at its forward edge. In addition, at least a portion of the forward edge of the top side may be offset relative to the forward edge of the bottom side such that an access window is defined between the top side and the first blade segment when the forward end of the blade insert is positioned adjacent to the first joint end of the first blade segment.

In another aspect, the present subject matter is directed to a blade segment for coupling a first blade segment to a second blade segment. The blade segment may generally include an aerodynamic body extending between a forward end configured to be coupled to the first blade segment and an aft end configured to be coupled to the second blade segment. The aerodynamic body may include a top side extending between a forward edge and an aft edge. The top side may define a top scarfed section at its forward edge. The aerodynamic body may further include a bottom side extending between a forward edge and an aft edge. The bottom side may define a bottom scarfed section at its forward edge. Additionally, at least a portion of the forward edge of the top side may be configured to be offset relative to the forward edge of the bottom side.

In a further aspect, the present subject matter is directed to a method for assembling a blade insert between a first blade segment and a second blade segment. The blade insert may include a top side extending between a forward edge and an aft edge and a bottom side extending between a forward edge and an aft edge. The method may generally include positioning a forward end of the blade insert adjacent to a first joint end of the first blade segment. At least a portion of the forward edge of the top side may be offset relative to the forward edge of the bottom side such that an access window is defined between the blade insert and the first blade segment. In addition, the method may include positioning a bottom scarfed connector between a bottom scarfed section defined in the bottom side of the blade insert and a bottom scarfed section defined in the first blade segment, positioning a window cover across at least a portion of the access window and positioning a top scarfed connector between a top scarfed section defined in the top side of the blade insert and a top scarfed section defined in the first blade segment.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine;

FIG. 2 illustrates a perspective view of one embodiment of one of the rotor blades of the wind turbine shown in FIG. 1;

FIG. 3 illustrates an exploded view of one embodiment of a rotor blade assembly in accordance with aspects of the present subject matter;

FIG. 4 illustrates a perspective view of one embodiment of a suitable blade insert configuration that may be utilized with the disclosed rotor blade assembly in accordance with aspects of the present subject matter;

FIG. 5 illustrates a cross-sectional view of the blade insert shown in FIG. 4 taken about line 5-5;

FIG. 6 illustrates a perspective view of one embodiment of a suitable blade segment configuration that may be utilized with the disclosed rotor blade assembly in accordance with aspects of the present subject matter;

FIG. 7 illustrates an exploded view of a portion of one embodiment of the disclosed rotor blade assembly, particularly illustrating the rotor blade assembly including the blade insert shown in FIGS. 4 and 5 and the blade segment shown in FIG. 6;

FIG. 8 illustrates a perspective, assembled view of the components shown in FIG. 7;

FIG. 9 illustrates a cross-sectional view of a portion of the rotor blade assembly shown in FIG. 8 taken about line 9-9;

FIG. 10 illustrates a perspective view of another embodiment of a suitable blade insert configuration that may be utilized with the disclosed rotor blade assembly in accordance with aspects of the present subject matter;

FIG. 11 illustrates a cross-sectional view of a portion of the blade insert shown in FIG. 10 taken about line 11-11;

FIG. 12 illustrates a perspective view of another embodiment of a suitable blade segment configuration that may be utilized with the disclosed rotor blade assembly in accordance with aspects of the present subject matter;

FIG. 13 illustrates an exploded view of a portion of one embodiment of the disclosed rotor blade assembly, particularly illustrating the rotor blade assembly including the blade insert shown in FIGS. 10 and 11 and the blade segment shown in FIG. 12;

FIG. 14 illustrates a perspective, assembled view of the components shown in FIGS. 13; and FIG. 15 illustrates a cross-sectional view of a portion of the rotor blade assembly shown in FIG. 14 taken about line 15-15.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a blade insert configured to be secured between separate blade segments of a wind turbine rotor blade. In several embodiments, the blade insert may be installed between the blade segments as a one-piece construction (as opposed to installing the blade segment in two or more pieces, such as by installing separate shell halves of an insert between the blade segments). Thus, as will be described below, the blade insert may be configured such that certain access features (e.g., access windows) are defined between the insert and the blade segments to permit the ends of the blade insert to be secured to the joint end of each blade segment. In addition, various assembly components (e.g., scarfed connectors, shell inserts, window covers, etc.) may be installed between the blade insert and the blade segment to facilitate coupling such components to one another.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Referring now to FIG. 2, a perspective view of one of the rotor blades 22 shown in FIG. 1 is illustrated. As shown, the rotor blade 22 generally includes a blade root 24 configured for mounting the rotor blade 22 to the hub 20 of the wind turbine 10 (FIG. 1) and a blade tip 26 disposed opposite the blade root 24. A body 28 of the rotor blade 22 may generally be configured to extend between the blade root 24 and the blade tip 26 and may serve as the outer casing/skin of the blade 22. In several embodiments, the body 28 may define a substantially aerodynamic profile, such as by defining a symmetrical or cambered airfoil-shaped cross-section. As such, the body 28 may include a pressure side 30 and a suction side 32 extending between a leading edge 34 and a trailing edge 36. Further, the rotor blade 22 may have a span 38 defining the total length between the blade root 22 and the blade tip 24 and a chord 40 defining the total length between the leading edge 34 and the trialing edge 36. As is generally understood, the chord 40 may vary in length with respect to the span 38 as the rotor blade 22 extends from the blade root 22 to the blade tip 24.

In several embodiments, the body 28 of the rotor blade 22 may be formed as a single, unitary component. Alternatively, the body 28 may be formed from a plurality of shell components. For example, the body 28 may be manufactured from a first shell half generally defining the pressure side 30 of the rotor blade 22 and a second shell half generally defining the suction side 32 of the rotor blade 20, with the shell halves being secured to one another at the leading and trailing edges 34, 36 of the blade 22. Additionally, the body 28 may generally be formed from any suitable material. For instance, in one embodiment, the body 28 may be formed entirely from a laminate composite material, such as a carbon fiber reinforced laminate composite or a glass fiber reinforced laminate composite. Alternatively, one or more portions of the body 28 may be configured as a layered construction and may include a core material 42 (e.g., as shown in FIG. 6), formed from a lightweight material such as wood (e.g., balsa), foam (e.g., extruded polystyrene foam) or a combination of such materials, disposed between layers of laminate composite material.

It should be appreciated that the rotor blade 22 may also include one or more longitudinally extending structural components configured to provide increased stiffness, buckling resistance and/or strength to the rotor blade 22. For example, in several embodiments, the rotor blade 22 may include a pair of spar caps (e.g., a top spar cap 44 and a bottom spar cap 46) and one or more shear webs 48 extending between the opposed spar caps 44, 46 (e.g., as shown in FIG. 6).

Referring now to FIG. 3, one embodiment of a rotor blade assembly 100 is illustrated in accordance with aspects of the present subject matter. As shown, the rotor blade assembly 100 may include a first blade segment 102 (or 202), a second blade segment 104 (or 204) and a blade insert 106 (or 206) configured to be coupled between the first and second blade segments 102, 104. In general, the rotor blade assembly 100 may be configured such that, when the first and second blade segments 102, 104 are coupled together via the blade insert 106, a complete rotor blade is formed.

In several embodiments, the first and second blade segments 102, 104 may be formed by dividing a pre-existing rotor blade 22 into two separate blade sections. For example, as shown in FIG. 2, in one embodiment, the illustrated rotor blade 22 may be divided into the first and second blade segments 102, 104 by cutting the rotor blade 22 along a joint or cut line 108. Thus, in the illustrated embodiment, the first blade segment 102 may correspond to a root segment of the rotor blade 22 and may extend between the blade root 24 and a first joint end 110 formed at the cut line 108. Similarly, in the illustrated embodiment, the second blade segment 104 may correspond a tip segment of the rotor blade 22 and may extend between the blade tip 26 and a second joint end 112 formed at the cut line 108.

It should be appreciated that, although the first blade segment 102 is shown as a root segment and the second blade segment 104 is shown as a tip segment, the terms "first blade segment" and "second blade segment" may generally refer to any suitable segments or sections of the rotor blade 22. For example, in another embodiment, the first blade segment 102 may correspond to a tip segment of the rotor blade 22 and the second blade segment 104 may correspond to a root segment of the rotor blade 22. In a further embodiment, the first and second blade segments 102, 104 may correspond to shorter segments of the rotor blade 22.

Additionally, it should be appreciated that, as used herein, the terms "first blade segment" and "second blade segment" need not be limited to a single, continuous blade segment. For example, in the illustrated embodiment, the first blade segment 102 may be formed from a single, unitary blade segment extending between the blade root 24 and the first joint end 110 or the first blade segment 102 may be formed from two or more blade segments that, when coupled together, extend between blade root 24 and the first joint end 110. Similarly, in the illustrated embodiment, the second blade segment 104 may be formed from a single, unitary blade segment extending between the second joint end 112 and the blade tip 26 or the second blade segment 104 may be formed from two or more blade segments that, when coupled together, extend between the second joint end 112 and the blade tip 26.

Moreover, it should be appreciated that the cut line 108 (FIG. 2) may generally be located at any suitable position along the span 38 of the rotor blade 22. For example, in one embodiment, the distance of the cut line 108 from the blade root 24 may range from about 40% to about 95% of the span 38, such as from about 40% to about 80% of the span 28 or from about 50% to about 65% of the span 38. However, it is foreseeable that, in other embodiments, the distance of the cut line 108 from the blade root 34 may be less than 40% of the span 38 or greater than 95% of the span 38.

It should also be appreciated that, in alternative embodiments, the first and second blade segments 102, 104 need not be formed by cutting or otherwise dividing a pre-existing rotor blade 22 into two separate blade sections. For example, in another embodiment, the first and second blade segments 102, 104 may be separately manufactured and assembled together with the blade insert 106 to form the disclosed rotor blade assembly 100.

Referring still to FIG. 3, the blade insert 106 of the rotor blade assembly 100 may generally comprise an elongated, aerodynamic body 114 extending between a forward end 116 and an aft end 118, thereby forming a separate blade segment of the rotor blade assembly 100. In general, the blade insert 106 may be configured to be coupled between the first and second blade segments 102, 104 in order to form the rotor blade assembly 100. Specifically, the forward end 116 of the blade insert 106 may be configured to be coupled to the joint end 110 of the first blade segment 102 and the aft end 118 of the blade insert 106 may be configured to be coupled to the joint end 112 of the second blade segment 104. Suitable configurations and methods for attaching the blade insert 106 (or 206) between the first and second blade segments 102, 104 (or 202, 204) will generally be described below with reference to FIGS. 4-15.

Referring now to FIGS. 4-6, one embodiment of a particular blade insert/segment configuration that may be used to effectively and efficiently secure a blade insert 106 between first and second blade segments 102, 104 of a rotor blade assembly 100 is illustrated in accordance with aspects of the present subject matter. Specifically, FIG. 4 illustrates a perspective view of the blade insert 106 and FIG. 5 illustrates a cross-sectional view of the blade insert 106 taken about line 6-6. Additionally, FIG. 6 illustrates a perspective view of a corresponding configuration that may be used for the first blade segment 102 and/or the second blade segment 104.

As indicated above, the blade insert 106 may generally include an elongated body 114 extending spanwise between a forward end 116 and an aft end 118, with the forward end 116 configured to be coupled to the joint end 110 of the first blade segment 102 and the aft end 118 being configured to be coupled to the joint end 112 of the second blade segment 104. In general, the body 114 may be configured to define a substantially aerodynamic profile, such as by defining a symmetric or cambered airfoil-shaped cross-section. Thus, as shown in FIGS. 4 and 5, the body 114 may include a top side 120 (e.g., a pressure side) and a bottom side 122 (e.g., suction side) extending between a leading edge 124 and a trailing edge 126. Additionally, as shown, the top side 120 of the body 114 may be configured to extend spanwise between a forward edge 128 disposed at the forward end 116 of the blade insert 106) and an aft edge 130 disposed at the aft end 118 of the blade insert 106. Similarly, the bottom side 122 of the body 114 may be configured to extend spanwise between a forward edge 132 (disposed at the forward end 116 of the blade insert 106 and an aft edge 134 disposed at the aft end 118 of the blade insert 106.

In several embodiments, at least a portion of the forward and aft edges 128, 130 of the top side 120 of the blade insert 106 may be recessed or offset from the forward and aft edges 132, 134 respectively, of the bottom side 122 of the blade insert 106. For example, as shown in the illustrated embodiment, the forward edge 128 of the top side 120 may be inwardly offset or recessed (i.e., in the direction of the aft end 118 of the blade insert 106) from the forward edge 132 of the bottom side 122 by a first spanwise distance 136. Similarly, the aft edge 130 of the top side 120 may be inwardly offset or recessed (i.e., in the direction of the forward end 116 of the blade insert 106) from the aft edge 134 of the bottom side 122 by a second spanwise distance 138. As will be described below, by offsetting the edges 128, 130, 132, 134 of the top and bottom sides 120, 122 as shown in FIGS. 4 and 5, one or more access windows 140 (FIG. 7) may be defined at the forward and aft ends 116, 118 of the blade insert 106 when the insert 106 is positioned between the first and second blade segments 102, 104. Such access windows 140 may generally allow for service workers to access the interior of the rotor blade assembly 100, thereby allowing various components to be positioned within the rotor blade assembly 100 to facilitate securing the blade insert 106 between the blade segments 102, 104.

It should be appreciated that the first and second spanwise distances 136, 138 may generally correspond to any suitable distance. Additionally, in one embodiment, the first spanwise distance 136 may be equal to the second spanwise distance 138. Alternatively, the first spanwise distance 136 may be greater or less than the second spanwise distance 138.

It should also be appreciated that, as used herein, the terms "forward" and "aft" are simply used to distinguish the opposed ends 110, 112 and/or edges 128, 130, 132, 134 of the blade insert 106. Thus, although the forward end 110 of the blade insert 106 is described herein as being configured to be coupled to the joint end 110 of the first blade segment 102, the aft end 112 of the blade insert 106 may instead be configured to be coupled to the first blade segment 102. Similarly, as used herein, the terms "top" and "bottom" are simply used to distinguish the opposed sides 120, 122 of the blade insert 106. For example, in the illustrated embodiment, the top side 120 of the blade insert 106 corresponds to the pressure side while the bottom side 122 corresponds to the suction side. However, in another embodiment, the top side 120 of the blade insert 106 may correspond to the suction side while the bottom side 122 may correspond to the pressure side.

Additionally, in several embodiments, the blade insert 106 may include the same or similar internal structural components as the first and second blade segments 102, 104. For example, as shown in FIG. 4, the blade insert 106 may include a pair of longitudinally extending spar caps (e.g., a top spar cap 142 and a bottom spar cap 144), with each spar cap 142, 144 being integrated into and/or forming part of either the top side 120 or the bottom side 122 of the blade insert 106. In addition, the blade insert 106 may include one or more shear webs 146 extending between the opposed spar caps 142, 144. For example, as shown in FIG. 5, in one embodiment, the shear web 146 may be configured to extend lengthwise between a first end 148 and a second end 150, with the first end 148 generally being aligned with the forward edge 128 of the top side 120 of the blade insert 106 and the second end 106 generally being aligned with the aft end 130 of the top side 120.

Moreover, in several embodiments, one or more tapered or scarfed sections may be defined along the top and bottom sides 120, 122 of the blade insert 106. For example, as shown in FIGS. 4 and 5, first and second top scarfed sections 152, 154 may be defined along the outer surface of the top side 120, with the first top scarfed section 152 extending lengthwise from an inner edge 156 to the forward edge 128 of the top side 120 and the second top scarfed section 154 extending from an inner edge 158 to the aft edge 130 of the top side 120. Similarly, as shown in FIGS. 4 and 5, first and second bottom scarfed sections 160, 162 may be defined along the inner surface of the bottom side 122, with the first bottom scarfed section 160 extending from an inner edge 164 to the forward edge 132 of the bottom side 122 and the second bottom scarfed section 162 extending from an inner edge 166 (FIG. 5) to the aft edge 134 of the bottom side 122. In such an embodiment, each scarfed section 152, 154, 160, 162 may be configured to taper outwardly from its inner edge 156, 158, 164, 166 (i.e., with the height of each scarfed section 152, 154, 160, 162 increasing from its inner edge 156, 158, 164, 166 to the respective forward or aft edges 128, 130, 132, 134 of the top or bottom sides 120, 122 of the blade insert 106).

It should be appreciated that the scarfed sections 152, 154, 160, 162 may generally be defined at any suitable chordwise location along the top and bottom sides 120, 122 of the blade insert 106. However, in several embodiments, the scarfed sections 152, 154, 160, 162 may be aligned with the spar caps 142, 144 of the blade insert 106. For example, as shown in FIG. 4, the top scarfed sections 152, 154 are generally aligned with the top spar cap 142 while the bottom scarfed sections 160, 162 are generally aligned with the bottom spar cap 144. In such an embodiment, a width 168 of each scarfed section 152, 154, 160, 162 may generally correspond to the width of the spar caps 142, 144. Alternatively, the width 168 of each scarfed section 152, 154, 160, 162 may be greater or less than the width of the spar caps 142, 144.

Additionally, it should be appreciated that each scarfed section 152, 154, 160, 162 may generally be configured to extend any suitable length 170 between its edges. For example, as shown in FIGS. 4 and 5, in one embodiment, the length 170 of the bottom scarfed sections 160, 162 may be selected so that the inner edges 164, 166 of such scarfed sections 160, 162 are disposed adjacent to ends 148, 150 of the shear web 146 (i.e., so as to be vertically aligned with the forward and aft edges 128, 130 of the top side 120 of the blade insert 106). However, in other embodiments, the inner edges 164, 166 of the bottom scarfed sections 160, 162 may be spaced apart from the end 148, 150 of the shear web 146 (and/or the edges 128, 130 of the tip side 120).

Moreover, in several embodiments, a portion of the shell(s) forming the blade insert 10 may be recessed relative to the forward and aft edges 128, 130, 132, 134 of the top and bottom sides 120, 122. For example, as shown in FIG. 4, only an inner layer of the top side shell (e.g., one or more layers of laminate composite) may extend to the forward and aft edges 128, 130 of the top side 120 while only an outer layer of the bottom side shell (e.g., one or more layers of laminate composite) may extend to the forward and aft edges 132, 134 of the bottom side 122, thereby defining top and bottom flanges 172, 174 extending across portions of such edges 128, 130, 132, 134. As will be described below, after aligning the blade insert 106 between the first and/or second blade segments 102, 104, the outer layers of the shell(s) (e.g., one or more outer layers of laminate composite and/or one or more layers of core material 42) may then be positioned onto the top and the bottom flanges 172, 174 to fill the voids defined by the flanges 172, 174.

Referring now to FIG. 6, a perspective view of a suitable segment configuration for attaching each blade segment 102, 104 to the blade insert 106 shown in FIGS. 4 and 5 is illustrated in accordance with aspects of the present subject matter. Specifically, FIG. 6 illustrates a perspective view of the joint end 110 of the first blade segment 102. However, it should be appreciated that the joint end 112 of the second blade segment 104 may be configured the same as or similar to the joint end 110 shown in FIG. 6.

As shown, the blade segment 102 may be modified to include scarfed sections 175, 176 configured to be aligned with the scarfed sections 152, 160 of the blade insert 106. Specifically, in the illustrated embodiment, the blade segment includes a top scarfed section 175 defined along the outer surface of its pressure side 30 that is configured to be aligned with the top scarfed section 152 defined at the forward edge 128 of the top side 120 of the blade insert 106. Similarly, the blade segment includes a bottom scarfed section 176 defined along the inner surface of its suction side 32 that is configured to be aligned with the bottom scarfed section 160 defined at the forward edge 132 of the bottom side 122 of the blade insert 106. As will be described below, suitable scarfed connectors may be positioned across the aligned scarfed sections 152, 160, 175, 176 to provide a means for securing the blade segment 102 to the blade insert 106.

Additionally, similar to the blade insert 106, the blade segment 102 may include an edge 177 at its joint end 110 that is offset from the edge of the opposing side of the blade segment 102 by a given spanwise distance 178. Specifically, in the illustrated embodiment, a portion of the shell may be removed along the pressure side 30 between the joint end 110 and the top scarfed section 175, thereby creating the offset edge 177. As will be described below, this removed portion of the shell may form part of the access window 140 when the blade segment 102 and the blade insert 106 are positioned adjacent to one another.

Moreover, as shown in FIG. 6, a portion of the shell(s) forming the pressure and suction sides 30, 32 of the blade segment 102 may be recessed relative to the joint end 110 of the blade segment 102. For example, similar to the blade insert 106, only an inner layer of the shell(s) (e.g., one or more layers of laminate composite) may be configured to extend to the joint end 110 of the blade segment 102, thereby defining top and bottom flanges 179, 180 around portions of the perimeter of the joint end 110.

Referring now to FIGS. 7-9, several assembly views of the blade insert 106 shown in FIGS. 4 and 5 and the blade segment 102 shown in FIG. 6 are illustrated in accordance with aspects of the present subject matter. Specifically, FIG. 7 illustrates a perspective view of the blade insert 106 and the blade segment 102 positioned end-to-end, with suitable components for securing the blade insert 106 to the blade segment 102 being exploded outward. FIG. 8 illustrates a perspective, assembled view of the blade insert 106, the blade segment 102 and the various components shown in FIG. 7 and FIG. 9 illustrates a cross-sectional view of the rotor blade assembly 100 shown in FIG. 8 taken about line 9-9.

As shown in FIG. 7, when the blade insert 106 and the blade segment 102 are positioned end-to-end, an access window 140 may be defined between such components. This access window 140 may generally allow a service worker(s) to access the interior of the rotor blade assembly 100, thereby facilitating installation of many of the assembly components shown in FIG. 7. For example, in one embodiment, a bottom scarfed connector 181, bottom shell inserts 182 and a shear web insert 183 may be installed within the rotor blade assembly 100 via the access provided by the access window 140. Thereafter, the access window 140 may be covered by a suitable window cover 184 to allow the assembly process to be finalized.

As indicated above, when the blade insert 106 and the blade segment 102 are positioned end-to-end, the bottom scarfed section 160 at the forward end 116 of the blade insert 106 may be configured to be aligned with the bottom scarfed section 176 of the blade segment 102. Specifically, as shown in FIG. 9, the aligned bottom scarfed sections 160, 176 may be configured to abut one another when the blade insert 106 and blade segment 102 are positioned together. In such an embodiment, a bottom scarfed connector 181 may be positioned across the bottom scarfed sections 160, 176 in order to facilitate coupling the blade insert 106 to the blade segment 102. Specifically, as shown in FIGS. 7 and 9, the bottom scarfed connector 181 may generally define a tapered profile corresponding to the tapered profiles defined by the bottom scarfed sections 160, 176. Thus, as shown in FIG. 9, the bottom scarfed connector 181 may be configured to extend across the interface defined between the blade segment 102 and the blade insert 106 so as to fill the open area defined by the bottom scarfed sections 160, 176.

In several embodiments, the bottom scarfed connector 181 may comprise a pre-fabricated component configured to be separately installed within the rotor blade assembly 100 (via the access window 140) and secured across the aligned bottom scarfed sections 160, 176, such as by securing the scarfed connector 181 within the bottom scarfed sections 160, 176 using suitable adhesives and/or mechanical fasteners (e.g., bolts, screws, pins, rivets, brackets and/or the like). Alternatively, the bottom scarfed connector 181 may be formed or otherwise built-up within the aligned bottom scarfed sections 160, 176. For instance, in one embodiment, the scarfed connector 181 may be formed using a wet lay-up process, wherein a plurality of plies (including a reinforcement material such as glass or carbon fibers) are positioned across and/or within the bottom scarfed sections 160, 176 and a resin or other suitable matrix material is rolled over or otherwise applied to the surface of the plies and allowed to cure.

In addition to the bottom scarfed sections 160, 176, the bottom flanges 174, 180 of the blade insert 106 and the blade segment 102 may also be configured to abut one another when the blade insert 106 is positioned end-to-end with the blade segment 102. As such, suitable bottom shell inserts 182 may be secured across the bottom flanges 174, 180 along either side of the bottom scarfed connector 181 to further secure the blade insert 106 and the blade segment 102 to one another Specifically, the bottom shell inserts 182 may generally configured to extend across the interface defined between the blade segment 102 and the blade insert 106 so as to fill the open area defined by bottom flanges 174, 180. For example, as shown in FIG. 7, the bottom shell inserts 182 may generally define a profile matching the profile of the corresponding portions of the shells for the blade insert 106 and the blade segment 102 and may also be formed from the same material (e.g., one or more layers of laminate component and/or one or more layers of core material 44). It should be appreciated that, similar to the bottom scarfed connector 181, the bottom shell inserts 182 may be pre-fabricated components or may be formed or otherwise built-up within the open area defined by the bottom flanges 174, 180.

As indicated above, a shear web insert 183 may also be installed within the rotor blade assembly 100 via the access window 140. In general, the shear web insert 183 may be configured to extend spanwise across between the terminating ends of the shear webs 48, 146 for the blade segment 102 and the blade insert 106. Specifically, as shown in FIG. 9B, the shear web insert 183 may be configured to a define a length 185 generally corresponding to the length defined between the end of shear web 48 for the blade segment 102 and the end of the shear web 146 for the blade insert 106. As such, the shear web insert 183 may be installed within the rotor blade assembly 100 via the access window 140 and subsequently secured end-to-end between the shear webs 48, 146 (e.g., using a suitable adhesive(s) and/or a suitable mechanical fastener(s)).

Referring still to FIGS. 7-9, the rotor blade assembly 100 may also include a window cover 184 configured to extend across and/or cover at least a portion of the access window 140. Specifically, in several embodiments, the window cover 184 may be configured to define a shape generally corresponding to the shape of the access window 140. For example, as shown in FIG. 7, the window cover 184 may include a central portion 186 configured to be positioned over the shear web insert 183 so as to extend across the portion of the access window 140 defined between the aligned top scarfed sections 152, 175 of the blade insert 106 and the blade segment 102. Additionally, the window cover 184 may include side portions 187 configured to extend across the portions of the access window 140 extending down to the leading and trailing edges of the rotor blade assembly 100. As shown in FIG. 7, the side portions 187 of the window cover 184 may have a similar construction to that of the shells used to form the blade insert 106 and the blade segment 102. For example, the side portions 187 may be formed from a layered construction, including one or more layers of laminate material and/or one or more layers of core material 42.

Similar to the blade insert 106 and the blade segment 102, the outer layers of the side portions 187 may be recessed or offset, thereby creating cover flanges 188 around the edges of the window cover 184. Thus, when the window cover 184 is installed across the access window 140, the cover flanges 188 may be configured to abut against the top flanges 172, 179 of the blade insert 106 and the blade segment 102. Thereafter, suitable top shell inserts 189 may be secured across each interface defined between the top flanges 172 of the blade insert 106 and the cover flanges 188 and each interface defined between the top flanges 179 of the blade segment 102 and the cover flanges 188 so as to fill the open area defined by such flanges 172, 179, 188. For example, as shown in FIG. 7, the top shell inserts 189 may generally define a profile matching the profile of the corresponding portions of the shells for the blade insert 106 and the blade segment 102 and may also be formed from the same material (e.g., one or more layers of laminate component and/or one or more layers of core material 42).

Moreover, the rotor blade assembly 100 may also include a top scarfed connector 190 configured to be secured across the aligned top scarfed sections 152, 175 of the blade insert 106 and the blade segment 102. As shown in FIG. 7, the top scarfed connector 190 may include end sections 191 generally defining tapered profiles corresponding to the tapered profiles defined by the top scarfed sections 152, 175. Additionally, the top scarfed connector 190 may include a central section 192 generally defining a uniform profile. Thus, as shown in FIG. 9, when the top scarfed connector 190 is installed between the blade insert 106 and the blade segment 102, the central section 192 may extend across the central portion 186 of the window cover 184 while the end sections 191 may generally extend within and fill the area defined by the top scarfed sections 152, 175.

It should be appreciated that, similar to the bottom scarfed connector 181 and the bottom shell inserts 182, the top scarfed connector 190 and the top shell inserts 189 may be pre-fabricated components or may be formed or otherwise built-up during assembly of the rotor blade assembly 100.

It should also be appreciated that, after the various components of the rotor blade assembly 100 have been assembled between the blade segment 102 and the blade insert 106, an overlaminate may be applied around the outer surface of the assembly 100 to ensure a smooth aerodynamic transition between the blade segment 102 and the blade insert 106. For example, the overlaminate may be applied using a wet lay-up process, wherein one or more plies (including a reinforcement material such as glass or carbon fibers) are positioned along the outer surface and a resin or other suitable matrix material is rolled over or otherwise applied to the surface of the plies to form a smooth profile.

Additionally, it should be appreciated that, although the blade insert 106 was described with reference to FIGS. 7-9 as simply being secured to one of the blade segments (e.g., the first blade segment 102), the same or a similar methodology, as well as the same or similar components, may be used to secure the blade insert 106 to the other blade segment (e.g., the second blade segment 104). For example, a bottom scarfed connector 181, bottom shell inserts 182, a shear web insert 183, a window cover 184, top shell inserts 189 and a top scarfed connector 190 may be installed between the aft end 118 the blade insert 106 and the joint end 112 of the second blade segment 104 to allow such components to be secured to another in the same manner as the blade insert 106 and the first blade segment 102 (i.e., as shown in FIGS. 7-9).

Referring now to FIGS. 10-12, another embodiment of a particular blade insert/segment configuration that may be used to effectively and efficiently secure a blade insert 206 between first and second blade segments 202, 204 of a rotor blade assembly 100 is illustrated in accordance with aspects of the present subject matter. Specifically, FIG. 10 illustrates a perspective view of the blade insert 206 and FIG. 11 illustrates a partial, cross-sectional view of the blade insert 206 shown in FIG. 10 taken about line 11-11. Additionally, FIG. 12 illustrates a perspective view of a corresponding configuration that may be used for the first blade segment 202 and/or the second blade segment 204.

As shown in FIGS. 10 and 11, the blade insert 206 may be configured similarly to the blade insert 106 described above with reference to FIGS. 4 and 5. For example, the blade insert 206 may include an elongated body 214 extending spanwise between a forward end 216 and an aft end 218, with the forward end 216 being configured to be coupled to the joint end 110 of the first blade segment 202 and the aft end 218 being configured to be coupled to the joint end 112 of the second blade segment 204. The body 214 may generally be configured to define a substantially aerodynamic profile. Thus, as shown in FIGS. 10 and 11, the body 214 may include a top side 220 (e.g., a pressure side) and a bottom side 222 (e.g., suction side) extending between a leading edge 224 and a trailing edge 226. The top side 220 of the body 214 may be configured to extend spanwise between a forward edge 228 (disposed at the forward end 216 of the blade insert 206) and an aft edge 230 (disposed at the aft end 218 of the blade insert 206). Similarly, the bottom side 222 of the body 214 may be configured to extend spanwise between a forward edge 232 (disposed at the forward end 216 of the blade insert 206) and an aft edge 234 (disposed at the aft end 218 of the blade insert 2106). The blade insert 206 may also include the same or similar internal structural components as the first and second blade segments 202, 204, such as a pair of longitudinally extending spar caps (e.g., a top spar cap 242 and a bottom spar cap 244) and one or more shear webs 246 extending between the opposed spar caps 242, 244.

Additionally, similar to the blade insert 106 described above, a portion of the top side 220 of the blade insert 206 may be recessed or offset from the forward and aft edges 232, 234 of the bottom side 222 of the blade insert 206. For example, as shown in FIG. 10, portions of the top side 220 may be inwardly offset from the forward edge 232 of the bottom side 222 by a given spanwise distance 236 along either side of the top spar cap 242, thereby defining separate offset portions of the forward edge 228 of the top side 220. Similarly, portions of the top side 220 may also be inwardly offset from the aft edge 234 of the bottom side 222 by a given spanwise distance 238 along either side of the top spar cap 242, thereby defining separate offset portions of the aft edge 230 of the top side 220. As will be described below, by offsetting portions of the top side 220 as shown in FIG. 10, separate access windows 240, 241 may be defined at each end 216, 218 of the blade insert 206 when the insert 206 is positioned between the first and second blade segments 202, 204. Such access windows 240, 241 may generally allow for service workers to access the interior of the rotor blade assembly 100, thereby allowing various components to be positioned within the assembly 100 to facilitate securing the blade insert 206 between the blade segments 202, 204.

However, unlike the embodiment described above with reference to FIGS. 4 and 5, a portion(s) of the top side 220 of the blade insert 206 may also be configured to extend beyond the forward and aft edges 232, 234 of the bottom side 222 of the blade insert 206. Specifically, as shown in FIGS. 10 and 11, elongated portions 247 of the top side 220 (generally aligned with the top spar cap 242) may extend beyond the forward and aft edges 232, 234 of the bottom side 222, thereby defining extended portions of the forward and aft edges 228, 230 of the top side 220. As will be described below, such elongated portions 247 of the top side 220 may be configured to extend to a location at and/or adjacent to the joint ends 110, 112 of the blade segments 202, 204 when the blade insert 206 is positioned between the blade segments 202, 204.

Moreover, in several embodiments, one or more tapered or scarfed sections may be defined along the top and bottom sides 220, 222 of the blade insert 206. For example, as shown in FIG. 10, first and second top scarfed sections 252, 254 may be defined along the outer surface of the top side 220, with the first top scarfed section 252 extending from an inner edge 256 to the forward edge 228 of the elongated portion 247 of the top side 220 and the second top scarfed section 254 extending from an inner edge 258 to the aft edge 230 of the elongated portion 247 of the top side 220. Similarly, as shown in FIG. 10, first and second bottom scarfed sections 260, 262 may be defined along the inner surface of the bottom side 222, with the first bottom scarfed section 260 extending from an inner edge 264 to the forward edge 232 of the bottom side 222 and the second top scarfed section 262 extending from an inner edge (not shown) to the aft edge 234 of the bottom side 222. In such an embodiment, each scarfed section 252, 254, 260, 262 may be configured to taper outwardly from its inner edge 256, 258, 264 (i.e., with the height of each scarfed section 252, 254, 260, 262 increasing from its inner edge 256, 258, 264 to the respective forward or aft edges 228, 230, 232, 234 of the top and bottom sides 220, 222 of the blade insert 206).

Additionally, similar to the blade insert 106 described above, a portion of the shell(s) forming blade insert 206 may be recessed relative to the forward and aft edges 228, 230, 232, 234 of the top and bottom sides 220, 222. For example, as shown in FIG. 10, only an inner layer of the top side shell (e.g., one or more layers of laminate composite) may extend to the forward and aft edges 228, 230 of the top side 220 while only an outer layer of the bottom side shell (e.g., one or more layers of laminate composite) may extend to the forward and aft edges 232, 234 of the bottom side 222, thereby defining top and bottom flanges 272, 274 extending across portions of such edges 228, 230, 232, 234. As will be described below, the top and bottom flanges 272, 274 may facilitate securing the blade insert 206 between the first and second blade segments 202, 204. The outer layers of the shell(s) (e.g., one or more outer layers of laminate composite and/or one or more layers of core material 42) may then be positioned over the flanges 272, 274 to create a smooth surface along the inner and outer surfaces of the rotor blade assembly 100.

Referring now to FIG. 12, a perspective view of a suitable segment configuration for attaching each blade segment 202, 204 to the blade insert 206 shown in FIGS. 10 and 11 is illustrated in accordance with aspects of the present subject matter. Specifically, FIG. 12 illustrates a perspective view of the joint end 110 of the first blade segment 202. However, it should be appreciated that the joint end 112 of the second blade segment 204 may be configured the same as or similar to the joint end 110 shown in FIG. 12.

As shown, the blade segment 202 may be modified to include scarfed sections 275, 276 configured to be aligned with the scarfed sections 252, 260 of the blade insert 206. Specifically, in the illustrated embodiment, the blade segment 202 includes a top scarfed section 275 defined along the outer surface of its pressure side 30 that is configured to be aligned with top scarfed section 252 defined at the forward edge 228 of the top side 220 of the blade insert 206. Similarly, the blade segment 202 includes a bottom scarfed section 276 defined along the inner surface of its suction side 32 that is configured to be aligned with the bottom scarfed section 260 defined at the forward edge 232 of the bottom side 222 of the blade insert 206. As will be described below, a scarfed connector(s) may be positioned across each aligned pair of scarfed sections 252, 260, 275, 276 to provide a means for securing the blade segment 202 to the blade insert 206.

Additionally, similar to the blade insert 206, the blade segment 202 may include an offset edge(s) 277 at its joint end 110 that is offset from the edge(s) of the opposing side of the blade segment 202 by a given spanwise distance 278. Specifically, in the illustrated embodiment, a portion of the shell forming the pressure side 30 may be removed between the joint end 110 of the blade segment 202 and a front edge of the top scarfed section 275, thereby defining the offset edge 277. As will be described below, this removed portion of the shell may form part of the access window(s) 240, 241 defined between the blade segment 202 and the blade insert 206 when such components are positioned adjacent to one another. Moreover, as shown in FIG. 12, a portion of the shell(s) forming the pressure and suction sides 30, 32 of the blade segment 202 may also be removed, thereby defining upper and lower flanges 279, 280 around the perimeter of the joint end 110 of the blade segment 202.

Referring now to FIGS. 13-15, several assembly views of the blade insert 206 shown in FIGS. 10 and 11 and the blade segment 202 shown in FIG. 12 are illustrated in accordance with aspects of the present subject matter. Specifically, FIG. 13 illustrates a perspective view of the blade insert 206 and the blade segment 202 positioned end-to-end, with suitable components for securing the blade insert 206 to the blade segment 202 being exploded outward. FIG. 14 illustrates a perspective, assembled view of the various components shown in FIG. 13 and FIG. 15 illustrates a cross-sectional view of the assembly shown in FIG. 14 taken about line 15-15.

As shown in FIG. 13, when the blade segment 202 and the blade insert 206 are positioned end-to-end, separate access windows (e.g., a first access window 240 and a second access window 241) may be defined between such components along either side of the elongated portion 247 of the top side 220 of the blade insert 206. Such access windows 240, 241 may generally allow a service worker(s) to access the interior of the rotor blade assembly 100, thereby facilitating the installation of many of the assembly components shown in FIG. 14. For example, similar to the embodiment described above with reference to FIGS. 7-9, a suitable bottom scarfed connector 281 may be positioned across the interface defined between the aligned bottom scarfed sections 260, 276 of the blade insert 206 and the blade segment 202 while suitable bottom shell inserts 282 may be positioned at each interface defined between the bottom flanges 274, 280 of the blade insert 206 and the blade segment 202. In addition, as shown in FIGS. 13 and 15, a shear web insert 283 may be installed within the rotor blade assembly 100 so as to extend spanwise between the ends of the shear webs 48, 246 for the blade segment 202 and the blade insert 206.

After installing such components within the rotor blade assembly 100, suitable window covers 284a, 284b may then be installed between the blade insert 206 and the blade segment 206 so as to cover at least a portion of each access window 240, 241. For example, as shown in FIG. 13, a first window cover 284a may be configured to extend across and/or cover at least a portion of the first access window 240. Similarly, a second window cover 284b may be configured to extend across and/or cover at least a portion of the second access window 241. As shown in FIG. 13, the window covers 284a, 284b may generally have a similar construction to that of the shells used to form the blade insert 206 and the blade segment 202. For example, the window covers 284a, 284b may be formed from a layered construction, including one or more layers laminate material and one or more layers of core material 42.

Additionally, similar to the blade insert 206 and the blade segment 202, a portion of the shell(s) forming the window covers 284a, 284b may be recessed or offset, thereby defining cover flanges 288 around the edges of the window covers 284a, 284b. Thus, when each window cover 284a, 284b is installed across its corresponding access window 240, 241, the cover flanges 288 may be configured to abut against the top flanges 272, 279 of the blade insert 206 and the blade segment 202. Thereafter, a suitable top shell insert 289 may be secured across each interface defined between the blade segment 202 and the window covers 284a, 284b and across each interface defined between the blade insert 206 and the window covers 284a, 284b so as to fill the open area defined by the top and cover flanges 272, 279, 288. For example, as shown in FIG. 13, the top shell inserts 289 may generally define a profile matching the profile of the corresponding portions of the shells for the blade insert 206 and the blade segment 202 and may also be formed from the same material (e.g., one or more layers of laminate component and/or one or more layers of core material 42).

Moreover, as shown in the illustrated embodiment, the rotor blade assembly 100 may also include a top scarfed connector 290 configured to be positioned across the aligned top scarfed sections 252, 275 of the blade insert 206 and the blade segment 202. As shown in FIG. 13, the top scarfed connector 290 may define a tapered profile corresponding to the tapered profiles defined by the top scarfed sections 253, 275. Thus, as particularly shown in FIG. 15, the top scarfed connector 290 may be configured to extend across the interface defined between the blade segment 202 and the blade insert 206 so as to fill the area defined by the aligned top scarfed sections 252, 275.

It should be appreciated that, due to the elongated portion 247 of the top side 220 of the blade insert 206, the blade insert 206 may be configured to abut the blade segment 202 at the location of the top scarfed sections 252, 275 when the blade insert 206 and blade segment 202 are positioned end-to-end (e.g., as shown in FIG. 13). As such, the top scarfed connector 290 may be significantly shorter than the top scarfed connector 190 described above with reference to FIGS. 7-9.

It should also be appreciated that, similar to the embodiments described above with reference to FIGS. 7-9, the bottom scarfed connector 281, the bottom shell inserts 282, the top scarfed connector 290 and the tip shell inserts 289 may be pre-fabricated components or may be formed or otherwise built up during assembly of the rotor blade assembly 100. Additionally, it should be appreciated that, after the various components of the rotor blade assembly 100 have been assembled between the blade segment 202 and the blade insert 206, an overlaminate may be applied around the outer surface of the rotor blade assembly 100 to ensure a smooth aerodynamic transition between the blade segment 202 and the blade insert 206.

Moreover, it should be appreciated that, although the blade insert 206 was described with reference to FIGS. 13-15 as simply being secured to one of the blade segments (e.g., the first blade segment 202), the same or a similar methodology, as well as the same or similar components, may be used to secure the blade insert 206 to the other blade segment (e.g., the second blade segment 204). For example, a bottom scarfed connector 281, bottom shell inserts 282, a shear web insert 283, a window cover(s) 284a, 284b, top shell inserts 289 and a top scarfed connector 290 may be installed between the aft end 218 of the blade insert 206 and the joint end 112 of the second blade segment 204 to allow such components to be secured to another in the same manner that the blade insert 206 and the first blade segment 202 were secured together (e.g., as shown in FIGS. 13-15).

Further, it should be appreciated that each blade insert 106, 206 described herein may be considered as a blade segment. Thus, one of ordinary skill in the art should appreciate that the disclosed rotor blade assemblies 100, 200 may include one or a plurality of blade inserts 106, 206, with each blade insert forming an individual segment of the rotor blade assembly 100, 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, the rotor blade assembly comprising:
a first blade segment defining a first joint end;
a second blade segment defining a second joint end; and
a blade insert extending between a forward end coupled to the first blade segment and an aft end coupled to the second blade segment, the blade insert comprising:
a top side extending between a forward edge and an aft edge, the top side defining a top scarfed section at its forward edge; and
a bottom side extending between a forward edge and an aft edge, the bottom side defining a bottom scarfed section at its forward edge,
wherein at least a portion of the forward edge of the top side is offset relative to the forward edge of the bottom side such that an access window is defined between the top side and the first blade segment when the forward end of the blade insert is positioned adjacent to the first joint end of the first blade segment.

2. The rotor blade assembly of claim 1, wherein the first blade segment defines a bottom scarfed section at the first joint end, the bottom scarfed section of the first blade segment configured to be aligned with the bottom scarfed section of the blade insert.

3. The rotor blade assembly of claim 2, further comprising a scarfed connector extending between the aligned bottom scarfed sections.

4. The rotor blade assembly of claim 2, wherein the forward edge of the bottom side and the first blade segment abut one another at the aligned bottom scarfed sections when the forward end of the blade insert is positioned adjacent to the first joint end of the first blade segment.

5. The rotor blade assembly of claim 1, wherein the first blade segment defines a top scarfed section at the first joint end, the top scarfed section of the first blade segment configured to be aligned with the top scarfed section of the blade insert.

6. The rotor blade assembly of claim 5, further comprising a scarfed connector extending between the aligned top scarfed sections.

7. The rotor blade assembly of claim 5, wherein the aligned top scarfed sections are spaced apart from one another when the forward end of the blade insert is positioned adjacent to the first joint end of the first blade segment.

8. The rotor blade assembly of claim 5, wherein the top side includes an elongated portion that extends outwardly beyond the forward edge of the bottom side, the top scarfed section of the blade insert being defined in the elongated portion.

9. The rotor blade assembly of claim 8, wherein elongated portion of the top side and the first blade segment abut one another at the aligned top scarfed sections when the forward end of the blade insert is positioned adjacent to the first joint end of the first blade segment.

10. The rotor blade assembly of claim 1, further comprising a shear web insert extending across at least a portion of the blade insert.

11. The rotor blade assembly of claim 1, further comprising a wind cover configured to extend across at least a portion of the access window.

12. The rotor blade assembly of claim 1, wherein the top side further defines a top scarfed section at its aft edge and the bottom side further defines a bottom scarfed section at its aft edge, and wherein at least a portion of the aft edge of the top side is offset relative to the aft edge of the bottom side such that an access window is defined between the top side and the second blade segment when the aft end of the blade insert is positioned adjacent to the first joint end of the first blade segment.

13. The rotor blade assembly of claim 12, wherein the second blade segment defines both a bottom scarfed section and a top scarfed section at the second joint end, the bottom scarfed section of the second blade segment configured to be aligned with the bottom scarfed section of the bottom side of the blade insert and the top scarfed section of the second blade segment configured to be aligned with the top scarfed section of the top side of the blade insert.

14. The rotor blade assembly of claim 13, further comprising a bottom scarfed connector extending between the aligned bottom scarfed sections and a top scarfed connector extending between the aligned top scarfed sections.

15. A blade segment for coupling a first blade segment to a second blade segment, the blade segment comprising:
an aerodynamic body extending between a forward end configured to be coupled to the first blade segment and an aft end configured to be coupled to the second blade segment, the aerodynamic body including a top side extending between a forward edge and an aft edge, the top side defining a top scarfed section along its outer surface that extends between a top inner edge and the forward edge of the top side, the top scarfed section defining a tapered profile between the top inner edge and the forward edge of the top side, the aerodynamic body further including a bottom side extending between a forward edge and an aft edge, the bottom side defining a bottom scarfed section along its inner surface that extends between a bottom inner edge and the forward edge of the bottom side, the bottom scarfed section defining a tapered profile between the bottom inner edge and the forward edge of the bottom side,
wherein at least a portion of the forward edge of the top side is configured to be offset relative to the forward edge of the bottom side.

16. The blade segment of claim 15, wherein the top side includes an elongated portion that extends outwardly beyond the forward edge of the bottom side, the top scarfed section of the blade segment being defined in the elongated portion.

17. The blade segment of claim 15, wherein the top side further defines a second top scarfed section along its outer surface that extends between a second top inner edge and the aft edge of the top side, the second top scarfed section defining a tapered profile between the second top inner edge and the aft edge of the top side, the bottom side further defining a second bottom scarfed section along its inner surface that extends between a second bottom inner edge and the aft edge of the bottom side, the second bottom scarfed section defining a tapered profile between the second bottom inner edge and the aft edge of the bottom side, and wherein at least a portion of the aft edge of the top side is offset relative to the aft edge of the bottom side.

18. A method for assembling a blade insert between a first blade segment and a second blade segment, the blade insert including a top side extending between a forward edge and an aft edge and a bottom side extending between a forward edge and an aft edge, the method comprising:
positioning a forward end of the blade insert adjacent to a first joint end of the first blade segment, at least a portion of the forward edge of the top side being offset relative to the forward edge of the bottom side such that an access window is defined between the blade insert and the first blade segment;
positioning a bottom scarfed connector between a bottom scarfed section defined in the bottom side of the blade insert and a bottom scarfed section defined in the first blade segment;
positioning a window cover across at least a portion of the access window; and
positioning a top scarfed connector between a top scarfed section defined in the top side of the blade insert and a top scarfed section defined in the first blade segment.

19. The method of claim 18, further comprising positioning a shear web insert across at least a portion of the blade insert.

20. The method of claim 18, further comprising positioning shell inserts over at least a portion of a flange defined by at least one of the blade insert, the first blade segment or the window cover.

\* \* \* \* \*